(12) United States Patent
Erickson et al.

(10) Patent No.: US 10,296,300 B2
(45) Date of Patent: *May 21, 2019

(54) AIDING CREATION OF SERVICE OFFERS ASSOCIATED WITH A SERVICE DELIVERY FRAMEWORK

(71) Applicant: AT&T Intellectual Property I, L.P., Atlanta, GA (US)

(72) Inventors: Richard Erickson, Farmingdale, NJ (US); Samuel Glazer, New York, NY (US)

(73) Assignee: AT&T Services, Inc., San Antonio, TX (US)

( * ) Notice: Subject to any disclaimer, the term of this patent is extended or adjusted under 35 U.S.C. 154(b) by 905 days.

This patent is subject to a terminal disclaimer.

(21) Appl. No.: 14/659,873

(22) Filed: Mar. 17, 2015

(65) Prior Publication Data

US 2015/0199182 A1 Jul. 16, 2015

Related U.S. Application Data

(63) Continuation of application No. 11/972,273, filed on Jan. 10, 2008, now Pat. No. 9,009,058.

(51) Int. Cl.
*G06Q 10/06* (2012.01)
*G06Q 10/10* (2012.01)
(Continued)

(52) U.S. Cl.
CPC ............... *G06F 8/34* (2013.01); *G06Q 10/06* (2013.01); *G06Q 10/063* (2013.01); *G06Q 10/101* (2013.01)

(58) Field of Classification Search
CPC ............................. G06Q 10/06; G06Q 10/101
(Continued)

(56) References Cited

U.S. PATENT DOCUMENTS 5,706,437 A 1/1998 Kirchner et al.
6,633,888 B1 10/2003 Kobayashi
(Continued)

OTHER PUBLICATIONS

Gamma et al., "Design Patterns CD: Elements of Reusable Object-Oriented Software" Multimedia CD, pp. 1-431 (1995).

*Primary Examiner* — Jonathan P Ouellette
(74) *Attorney, Agent, or Firm* — Kilpatrick Townsend & Stockton LLP

(57) ABSTRACT

A method of aiding creation of a service offer associated with a Service Delivery Framework (SDF) includes providing a plurality of reusable Application Objects (AOs) that may be associated with an Interactive Development Environment (IDE). The AOs are prototype customer facing service offers that include standardized functions supporting ordering, billing, management and monitoring. The AOs also include standardized event formats and configurable attributes that affect the behavior and pricing of service offers derived from the AOs. A Services Marketplace facilitates reuse of AOs and supports relationships between customers, application creators, service providers and OSS/BSS providers. A computer-readable medium includes instructions that when executed by a computing device aids in creation of a service offer associated with a SDF by providing a plurality of reusable Application Objects (AOs) in the context of a services marketplace.

20 Claims, 25 Drawing Sheets

(51) Int. Cl.
*G06Q 10/08* (2012.01)
*G06Q 30/06* (2012.01)
*G06F 8/34* (2018.01)

(58) Field of Classification Search
USPC .................................................. 705/1.1–912
See application file for complete search history.

(56) References Cited

U.S. PATENT DOCUMENTS

| | | |
|---|---|---|
| 6,763,346 B1 | 7/2004 | Nishida et al. |
| 6,957,186 B1 | 10/2005 | Guheen et al. |
| 7,117,447 B2 | 10/2006 | Cobb et al. |
| 7,165,041 B1 | 1/2007 | Guheen et al. |
| 8,073,777 B2 | 12/2011 | Barry et al. |
| 2002/0064149 A1 | 5/2002 | Elliott et al. |
| 2003/0033379 A1* | 2/2003 | Civanlar ............ H04L 29/12009 709/218 |
| 2003/0120502 A1* | 6/2003 | Robb ..................... G06Q 30/04 705/34 |
| 2004/0088184 A1* | 5/2004 | Nijdam ................ G06Q 30/016 706/45 |
| 2005/0216421 A1 | 9/2005 | Barry et al. |
| 2005/0216451 A1* | 9/2005 | Enzler ................. G06F 17/3041 |
| 2007/0150480 A1* | 6/2007 | Hwang ................. G06Q 10/00 |
| 2008/0256020 A1* | 10/2008 | Wakefield ......... H04L 29/12169 |
| 2008/0256112 A1* | 10/2008 | Prudden ............ H04L 29/12188 |

* cited by examiner

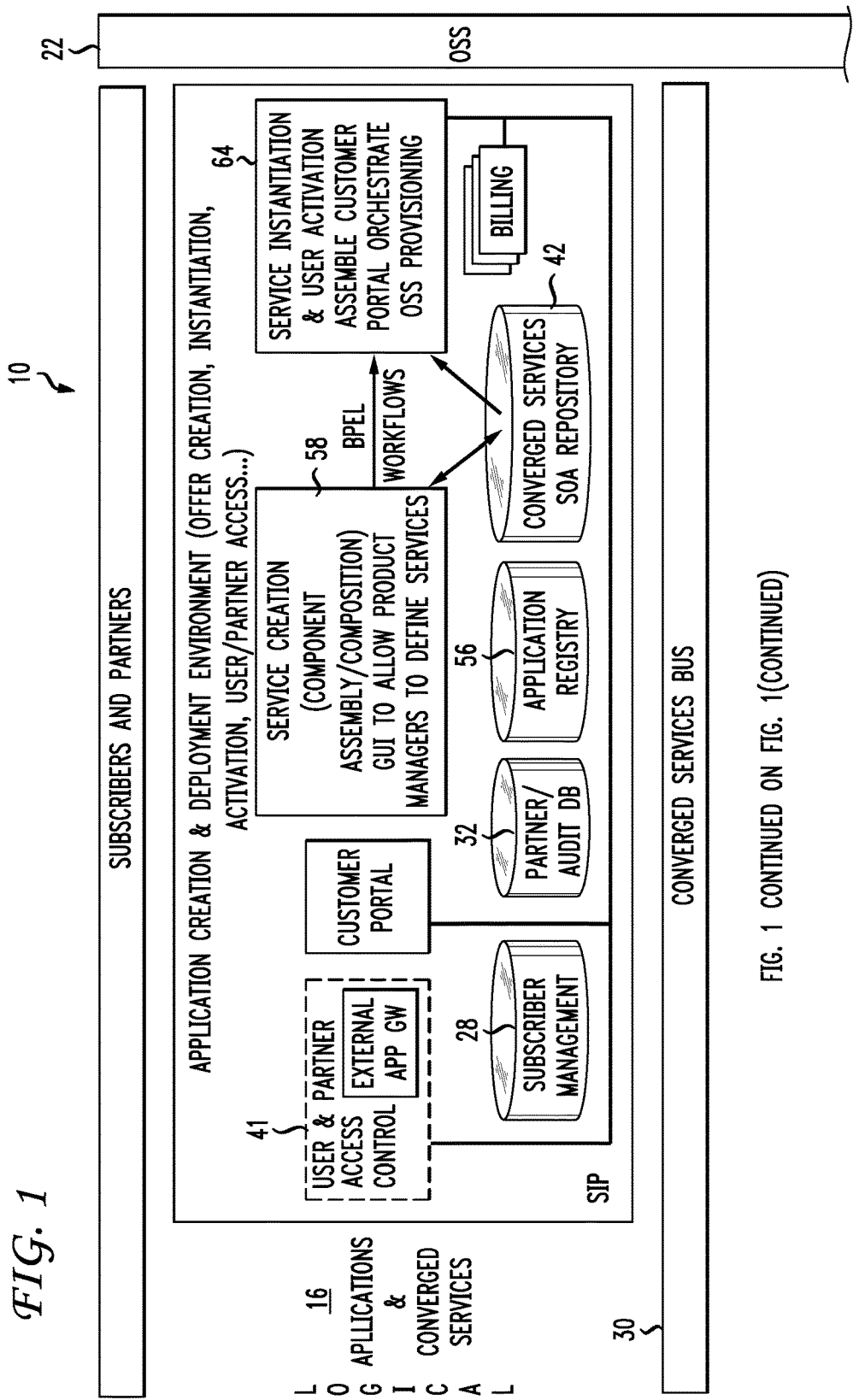
FIG. 1 CONTINUED ON FIG. 1(CONTINUED)

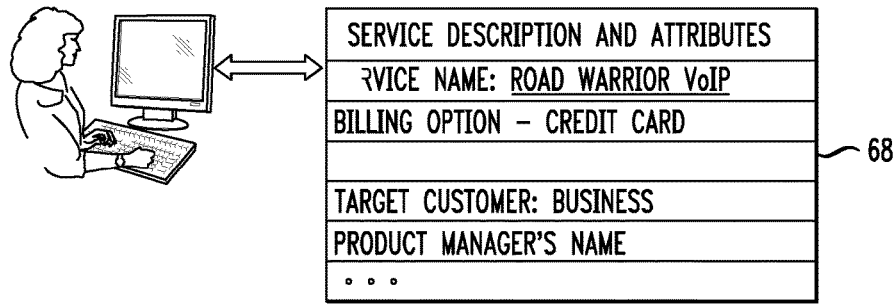
FIG. 6
FIG. 7
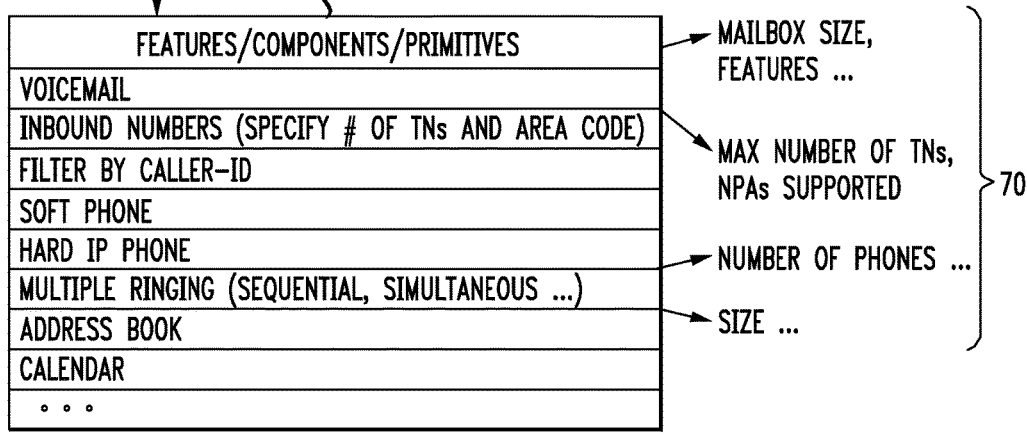
FIG. 8
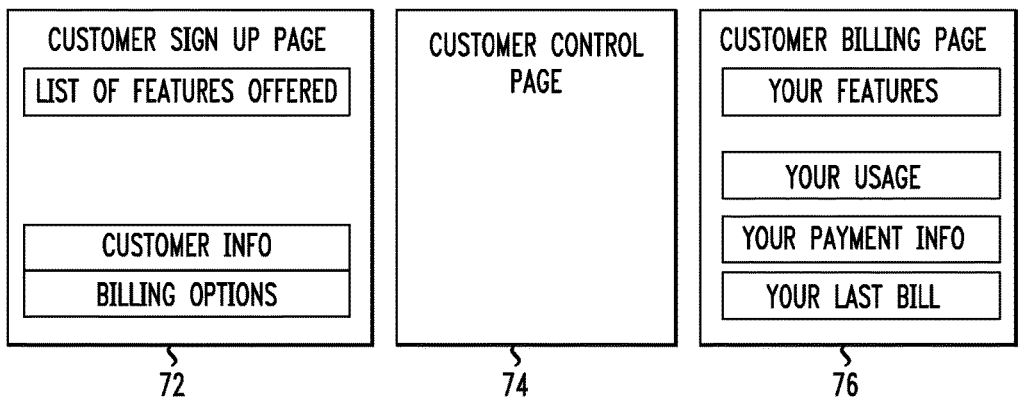

AIDING CREATION OF SERVICE OFFERS ASSOCIATED WITH A SERVICE DELIVERY FRAMEWORK

CROSS REFERENCE TO RELATED APPLICATION

This application is a continuation of U.S. application Ser. No. 11/972,273, filed Jan. 10, 2008, the disclosure of which is incorporated by reference herein in its entirety.

BACKGROUND

Field

The disclosed embodiments generally relate to creating service oriented applications, and more particularly relates to utilizing Application Objects (AOs) based on an Application Component Model (ACM) to reduce the development challenge associated with the creation of customer facing service offers. The AOs combine Graphical User Interface (GUI) and Service Oriented Architecture (SOA) programmatic Application Program Interface (API) functionality into an object package that can be manipulated with an Interactive Development Environment (IDE).

Brief Description of the Related Art

In the past, telecommunication companies have developed products (e.g., the Operational Support System (OSS)/Business Support System (BSS) vendor, Amdocs®) utilizing product objects with simple structures. In order for a company to create service offers for its customers, it had to do so in the context of a standard software development life cycle (SDLC) and process, which is typically nine (9) months from conception to offer deployment.

Traditional service delivery models are built using system smokestacks (i.e., service specific ordering, billing, assurance, inventory and provisioning systems) with little shared software, limited integration and interoperation between services, poor hardware and software utilization rates, and a high cost of product failure. Furthermore, even where common backend OSS/BSS systems are used, traditional service delivery models require custom OSS/BSS development, and are typically unprofitable when usage is low. Moreover, the vendors involved in traditional service delivery models (i.e., system integrators, equipment makers, and the like) often provide complete smokestack solutions, which lead to system duplication, and poorly interoperating services. Thus, there is a need for a new model.

SUMMARY

The disclosed embodiments relate to a method of using and re-using Application Objects (AOs) based on an Application Component Model (ACM) to create customer facing service offers that are developed and deployed in the context of a Service Delivery Framework (SDF). The AOs combine Graphical User Interface (GUI) and Service Oriented Architecture (SOA) programmatic Application Program Interface (API) functionality into an object package which can be leveraged by Product Managers through a simple GUI wizard to configure and operate on the AOs to rapidly produce customer facing service-offers. The disclosed embodiments further uses a portal framework that operates in conjunction with the service-offers configured from the AOs, to enable management, monitoring and ordering of service-offers without the necessity of creating service-offer-specific portal integrations. In addition, the disclosed embodiments further supports the manipulation of the AO object package using an Interactive Development Environment (IDE) by developers in order to create new AOs. The IDE is a system for supporting the process of writing software, which may include a syntax-directed editor, graphical tools for program entry, and integrated support for compiling and running the program and relating compilation errors back to the source. Such systems are typically both interactive and integrated. They are interactive in that the developer can view and alter the execution of the program at the level of statements and variables. They are integrated in that, partly to support the above interaction, the source code editor and the execution environment are tightly coupled by allowing the developer to see which line of source code is about to be executed and the current values of any variables it refers to.

A method of aiding creation of a service offer associated with a Service Delivery Framework (SDF) in accordance with the disclosed embodiments, which incorporates some of the preferred features, includes providing a plurality of reusable Application Objects (AOs) associated with an Interactive Development Environment (IDE). The AOs are prototype customer facing service offers including standardized functions that support ordering, billing, management, and monitoring of the customer facing service offers. The AOs include standardized event formats associated with the ordering, billing, management, and monitoring of the customer facing service offers. The AOs include configurable attributes that affect the service offer.

The method may include adapting the configurable attribute to enable creation of the service offer without requiring a software development lifecycle by at least one of configuring the attribute, setting a pricing rate, and providing marketing collateral. The method may also include adapting the plurality of AOs to comprise standardized Operational Support System/Business Support System (OSS/BSS) views referenced by Uniform Resource Locators (URLs), wherein the OSS/BSS views input a standardized context object and output a presentation layer in accordance with the SDF. The method may further include adapting the standardized context object to include context information, which includes at least one of an end user identifier, a service provider identifier, and a device identifier, wherein the context information enables configuration of the presentation layer in accordance with at least one of an end user, service provider, and device. The method may still further include storing the plurality of AOs and service offers configured from the plurality of AOs in an application registry, and supporting ordering, management, and monitoring of the service offer through a management portal without requiring service offer specific portal integration by referencing service offer information in the application registry.

The method may include referencing the plurality of AOs using view pointer references, wherein the view pointer references provide a layer of indirection and loose coupling to enable the plurality of AOs to encapsulate different OSS/BSS infrastructures to be used by different management portals. The method may also include generating a services marketplace to enable creation and reuse of AOs by different service providers and application creators supported by OSS/BSS providers, the plurality of AOs supporting service offer ordering, Service Level Agreements (SLAs), management and monitoring the service provider support of customer care and billing. The method may further include generating a services marketplace to support revenue collection and splitting between service providers, OSS/BSS providers and application creators. The method may yet further include generating a services marketplace to support customer service portability across service providers by enabling access to service and customer profiles by service providers. The method may still further include generating a services marketplace to support marketing and advertising by collecting and mining service and customer metadata.

The method may include enabling a user to select and configure at least one of the plurality of AOs, wherein the configuring includes at least one of specification of attributes and uploading of optional marketing collateral to generate a configured AO that can be referred to as a product. The method may also include enabling a user to generate an offer bundle by selecting and configuring a plurality of products or offer bundles, wherein the configuring includes at least one of specification of discounts, specification of promotions, and uploading of optional marketing collateral. The method may be adapted to be provided in an Interactive Development Environment (IDE).

The method may also include providing software development kits (SDKs) adapted to aid in creating AO view user interfaces (UIs) as a portion of the IDE. The method may further include enabling graphical representations of the plurality of AOs to be manipulated to create a new AO. The method may still further include performing at least one of end-user authentication, end-user authorization, protection against break-in attempts, invalid commands and overloads, storing AO view pointer references, storing AOs, storing products and service offers derived from the stored AOs, storing customer preferences, and storing service configurations, and storing customer runtime service state.

A tangible computer-readable carrier in accordance with the disclosed embodiments, which incorporates some of the preferred features, includes instructions, wherein execution of the instructions by at least one computing device aids in creation of a service offer within a Service Delivery Framework (SDF) in accordance with the above methods.

A system configured to share access to customer information in a multi-screen environment including a computing device configured to store customer information obtained from a first screen environment in a RSDB, the computing device configured to access the customer information from the RSDB for use in a second screen environment, the first screen environment being different from the second screen environment, in accordance with the above methods.

Other objects and features of the disclosed embodiments will become apparent from the following detailed description considered in conjunction with the accompanying drawings. It is to be understood, however, that the drawings are designed as an illustration only and not as a definition of the limits of the disclosed embodiments.

BRIEF DESCRIPTION OF THE DRAWINGS

FIG. 6 shows a first example of a process to create a customer facing service offer using a service offer wizard.

FIG. 7 shows a second example of a process to create a customer facing service offer using a service offer wizard.

FIGS. 8 and 9 show a third example of a process to create a customer facing service offer and validating the standard AO views through a staging environment.

FIG. 17 shows how URL pointers stored in an Application Registry provide a layer of indirection or loose coupling between a generic portal and the implementations of required AO functional views for ordering, management, monitoring, and the like.

DETAILED DESCRIPTION

Figure 1:
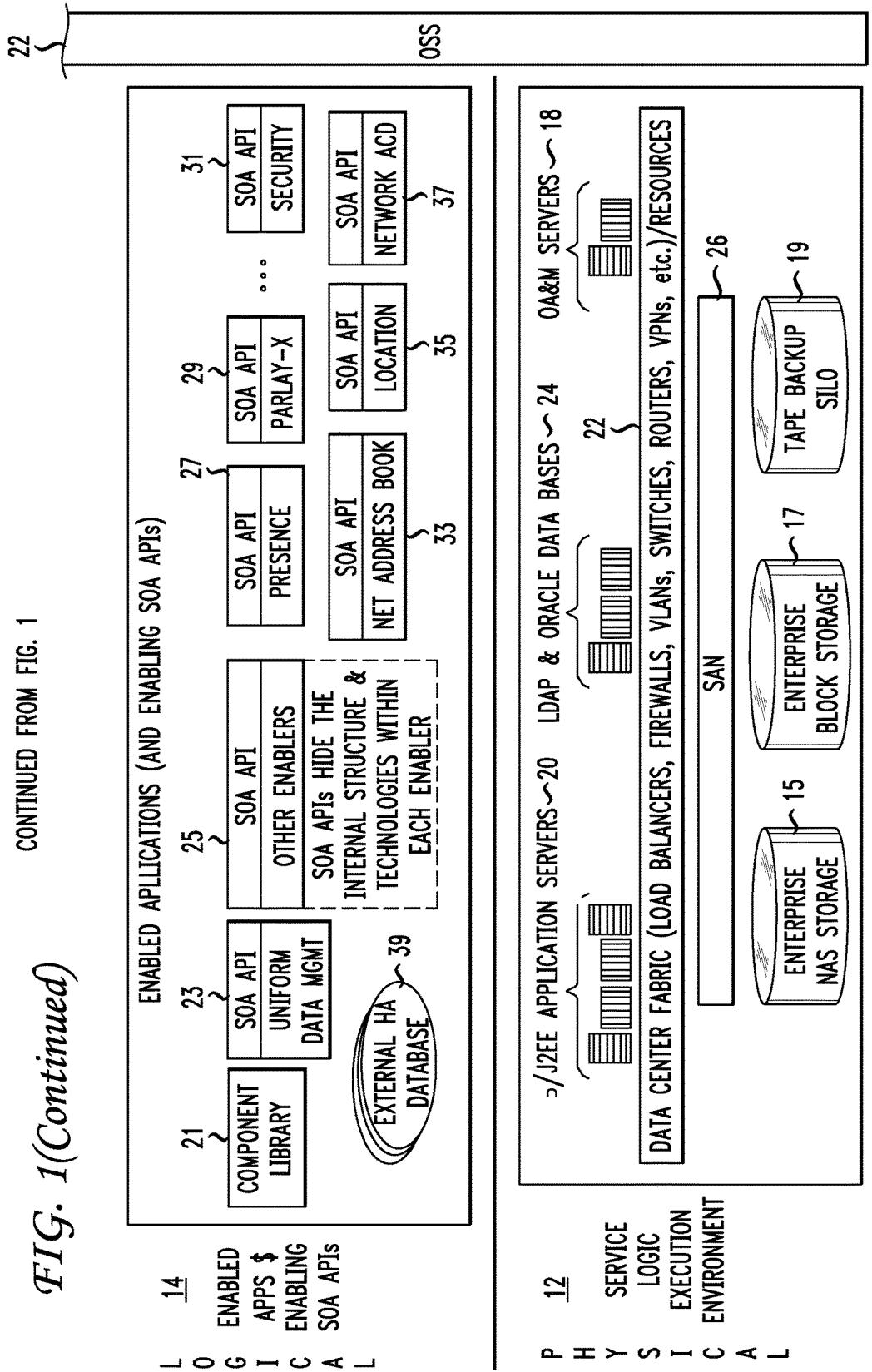
FIG. 1 is a block diagram of a Service Delivery Framework (SDF) architecture.

The disclosed embodiments introduce a new Service Delivery Framework (SDF) that leverages common components, enablers, web portals, integrated suites of interoperating products and has high utilization rates for hardware and software, a low cost of product failure, and a focus on creating reusable components and assembling multiple service offers with features and billing plans targeted to selected market segments. Furthermore, the SDF introduces Operational Support System/Business Support System (OSS/BSS) enabled components, known as Application Objects (AOs) which support the creation of customer facing service offers that can be profitable when usage is low, by enabling rapid offer creation and experimentation. In this new SDF, third party and internal developers provide AOs that interoperate with existing capabilities and are deployed on a common computing infrastructure which closely tracks Moore's law since the cost falls over time.

More specifically, in the disclosed embodiments, an Application Component Model (ACM) is introduced to form the basis of the Service Delivery Framework (SDF). The ACM defines the structure of reusable Application Objects (AOs) which provide the functionality underlying customer facing service offers. The AOs expose configurable attributes and certain framework-required operations that enable ordering, billing, and care, as well as product/offer creation by Product Managers through configurable attribute customization.

The disclosed embodiments utilize Application Objects (AOs) to dramatically reduce the application development challenges by combining Graphical User Interface (GUI) and Service Oriented Architecture (SOA) programmatic Application Program Interface (API) functionality into an object package that a) facilitates application reuse; b) supports ordering, billing, and care and other OSS/BSS functions; and c) can be manipulated with an Interactive Development Environment (IDE). In one embodiment, the object package may be graphically manipulated in the IDE. The object package leverages Uniform Resource Locators (URLs) to point to required OSS/BSS functional implementations. Each AO comprises the functionality of one or more customer facing service-offers (e.g., address book, location, or web mail) and incorporates required GUI views with programmatic APIs providing the runtime functionality of the service-offer, as well as the OSS functionality required to support ordering, configuration, provisioning, inventory, service assurance, and billing functions. More specifically, AOs are prototype customer-facing service offers, comprising functional capabilities that are potentially orderable, billable, and manageable but that have not yet been fully configured as service offers. An IDE, in accordance with an embodiment of the disclosed embodiments, preferably enables developers to drag AOs onto a screen and view the AOS in different ways. Ordering, configuration, provisioning, and other OSS/BSS views enable a simplified combination, rearrangement, and duplication of AO capabilities to produce a AO that combines the capabilities of the component applications. An AO further simplifies 1) product/offer creation based on AOs by product managers with limited technical capability through configuration of AO attributes, wizard-driven bundling of products and offers, and creation of HTML screens to introduce and describe new customer facing configurations and bundles; 2) AO creation by developers by facilitating reuse of the logic behind framework-standard GUIs and APIs required by the AO component model; and 3) service/offer presentment to customers and other users, such as care associates through management portals, by leveraging standardized AO functional capabilities available on all service offers derived from AOs. AOs are designed to be prototype service offers, which, with minimal configuration, can be used to generate actual customer facing offers.

The reuse of AOs in this way saves the development, test, and maintenance time required to recreate common units of functionality by providing a powerful, high-level, application-oriented object construct to reuse when designing and developing new services. This eliminates the conventional practice of reinventing GUI, API, and application functionality, and dramatically reduces the total time and cost required to develop new applications. The amount of this reduction depends on the relative percentage of new application logic/functionality to the reused application logic/functionality.

The disclosed embodiments further introduce a portal framework that is designed to operate in conjunction with rigorously defined AOs to dramatically reduce subscriber-facing portal development challenges and make dynamic offer creation within reach of product managers by using a GUI wizard that operates on the AOs. AOs are preferably registered in a product catalog or application registry, and package required GUI and programmatic hooks that enable the portal framework and offer management wizard to operate on the AOs. These hooks preferably span required OSS functionality including ordering and configuration GUIs, inventory GUIs, billable event and dispute GUIs, rate plan GUIs, assurance GUIs along with provisioning APIs, validation APIs, inventory APIs, billing APIs, assurance APIs, and rate plan APIs. An offer management portal, or wizard, preferably constructs AO based offers and offer bundles based on one or more of the AOs. The wizard preferably prompts for HTML and related web screens associated with the product or offer bundle, where appropriate, and provides an environment that enables the combination and configuration of AO components to generate an offer bundle. Once registered with the SDF product catalog, a management portal presents, manages, and monitors offers by looking up their programmatic and GUI hooks in the SDF product catalog/application registry as required.

The reuse of AOs, as described herein, saves the development, test, and maintenance time required to recreate and hand-code common units of application functionality by providing a powerful, high-level product object construct to reuse. It also enables rapid offer creation and experimentation in timeframes that are far shorter and less costly than the traditional release cycle and standard software development process. A software development kit (SDK or "devkit") is a group of development tools that enables a the creation of applications for a specific software package, software framework, hardware platform, computer system, video game console, operating system, or other platform.

Reusable Elements

Types of reusable elements include, but are not limited to, the following: (1) code libraries, such as JavaBeans®, subroutines, and the like; (2) service oriented APIs, that encapsulate commonly used and/or complex capabilities with simple functional APIs, also described as enablers (e.g., for authentication, network functions such as sending messages and atomic OSS/BSS capabilities such as storing ordering information in appropriate OSS/BSS databases); (3) AOs that i) are conformant with AO Application Component Model (ACM) APIs and GUIs for OSS/BSS functionality; ii) support standardized or common event formats that are preferably shared by each of the AOs (e.g., usage, capacity, availability, performance); iii) expose configurable and ratable attributes which can be used to configure their base functional capability into customer facing service offers. AOs are wrapped in object-like packages and provide configurable attributes and framework required GUIs and APIs that support promotion to products and offers, presentment to subscribers and other users (e.g. care personnel), and simplify development through reuse of the functionality encapsulated by required GUIs and APIs.

Enablers (Encapsulated by SOA APIs)
a. Access Control
 i. Access Control—Common ACL mechanism that allows applications to avoid direct credential management given a credential and a service.
b. Authentication
 i. Authentication—Strong credential mapping service. (E-library takes credentials and authenticates them against the credential repository).
 ii. Secure Token Service—Standards-based credential translation service for handling multiple token standards.
 iii. Identity Manager Partner—Accessible credential repository to control access to services, including utilities for adding and removing credentials.
c. Media
 i. Media Repository—Data store for streaming media.
 ii. Digital Rights Management—Rights management utility that maintains and disseminates licensing information for media.
 iii. Media Asset Profile—Metadata database for labeling and selecting media files.
 iv. Media Service Broker—Utility for managing multiple media resources on demand.
d. Messaging
 i. SMS—send/receive an SMS (short message service) message.
 ii. TTS—functions to support conversion of text to speech
 iii. ASR—functions to support conversion of speech to text (automatic speech recognition).
e. Notification
 i. Notification Service—Messaging component that provides signaling via, email, Instant Message, Short Message Service, and Voice Portal.
 ii. Mobile Web Initiative (MWI)—Provides state and control of subscriber MWI signals on internal and remote networks.
f. Presence
 i. Presence Service—A presence engine that maintains connectivity information on subscribers.
g. Session Routing
 i. Using one user resource as a key, identify all other user services as an endpoint.
 ii. User (device) Capabilities—Provides information about the capabilities of a specified device.
 iii. Rules-based filtering—functions to set/get call-handling preferences used to implement routing features, such as priority, selective call rejection, redirection, and the like
 iv. Conference Control Library—Functions for managing conference ports on multi-party calls, voice-chat services, and the like.
 v. Third (3$^{rd}$) party call control—functions to place calls, redirect calls, add a call leg.
 vi. Network Automatic Call Distributor (ACD)—functions to bond groups to a common contact number or map a role, such as service agent to an individual.
h. Subscriber Preferences
 i. Enhanced Subscriber Service—functions to support extended features for Plain Old Telephone Service (POTS) phones via Dual Tone Multi-Frequency (DTMF), web, and voice browser control (also known as, device bonding) (C-language SIP Servlet B2BUA with web interface built from several enablers or subcomponents).

Application Objects (Also Known as CARTS Applications)
 AOs include, but are not limited to, the following, which are applications which provide more than just raw functional capabilities, but have been designed to support ordering, management (such as revision, deletion, and addition of a function), monitoring and billing by or on behalf of customers with respect to the following functions:
a. Directory
 i. Global Network Address Book—A centralized contact list used by voice dial, and other applications.
b. Location
 i. Location Aggregator—Component to translate network activity into geo-location information based upon one of many potential data sources (i.e., Global Positioning System (GPS), Public Safety Answering Point (PSAP), etc) to be potentially used by residential customers to find their friends and family or by businesses to locate their personnel
c. Media
 i. Media Library—intended to provide a customer facing service that enables users to store and access their audio and video media in a way that can be easily leveraged by players, viewers, email and other applications.
d. Messaging
 iv. Universal Messaging—Provides users with the ability to send simple messages, emails and supports video messaging, automatic speech recognition and text-to-speech capabilities.
e. Notification
 iii. Alert Service—enables users to define alerts that will deliver messages to themselves or others under user specified conditions. Messages may be delivered via, email, Instant Message, Short Message Service, and Voice Portal.
f. Presence
 ii. Presence Service—enables users to view presence information on other users.
g. Session Routing
 vii. Conferencing—Service to setup and tear multi-party conferences, voice-chat services, and the like.
 viii. Network Automatic Call Distributor (ACD) Service—Service supporting configuration and reporting on group call handling in which a common contact number or role, such as service agent is mapped to a group of individuals. Utilizes registration to map individuals to roles rather than static number maps to define groups.
h. Subscriber Preferences
 i. Find-me Ring List—Service to enable users to define and manage priority rules for notification and voicemail screening/pickup.

Service Delivery Framework

FIG. 1 illustrates an SDF architecture 10, which is a logical representation of a service delivery environment with mobile and fixed networks, that includes three subsystems: an Application Creation and Deployment Environment subsystem 16, a common Enablers and Components subsystem 14, and a Service Logic Execution Environments (SLEE) subsystem 12, which is preferably for internal enterprise applications (enterprise SLEE) and may be used for customer applications (customer SLEE).

Figure 2:
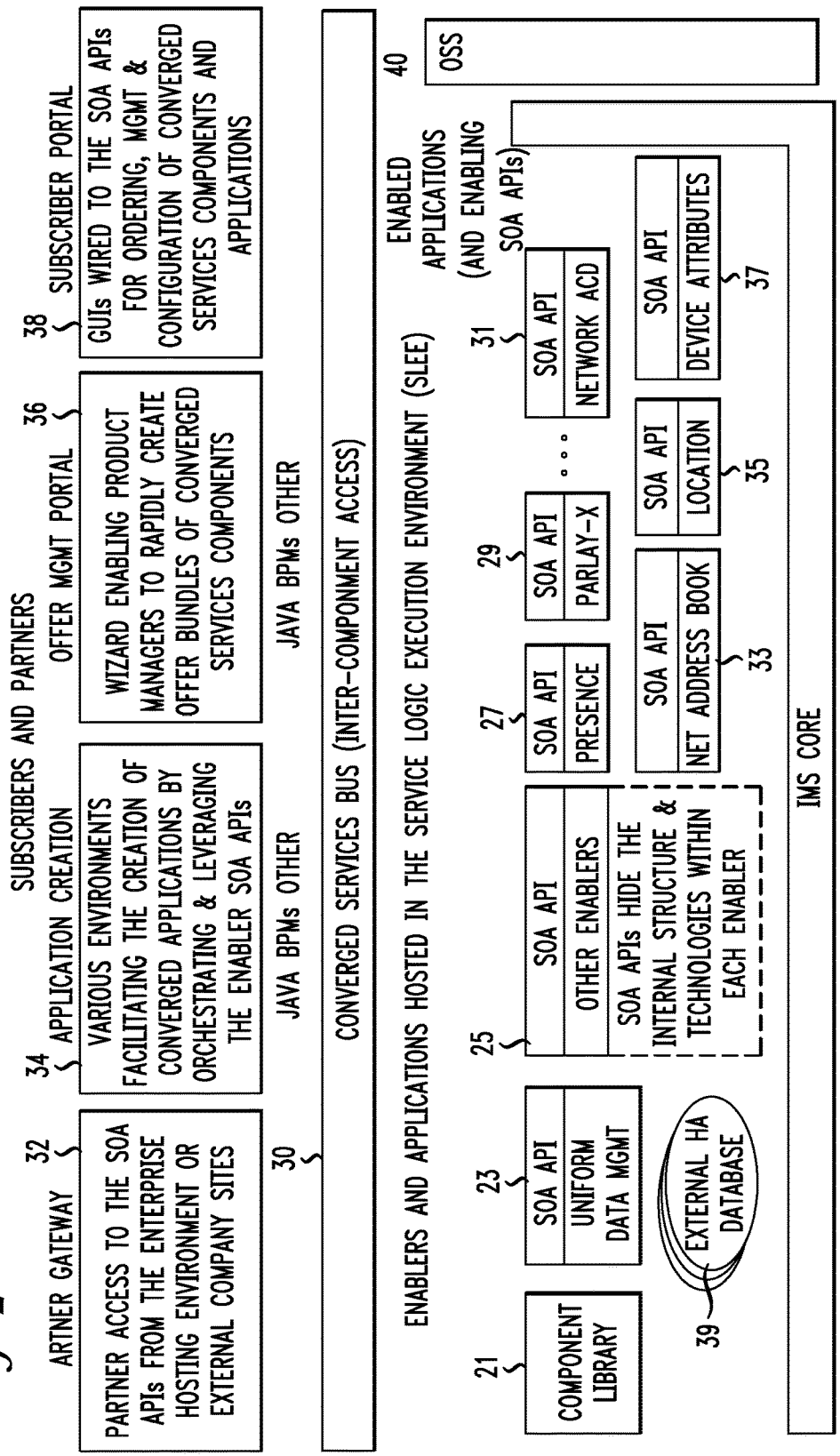
FIG. 2 is a block diagram of an Application Creation and Deployment Environment subsystem of the SDF architecture shown in FIG. 1.

The Application Creation and Deployment Environment subsystem 16, which includes the application creation 34, offer creation 36, and subscriber portal 38 (also known as a management portal), as shown in FIGS. 1 and 2, makes it possible to rapidly create new services and offers by assembling existing components. The Application Creation and Deployment Environment subsystem 16 enables existing services to be modified, facilitates the creation of new components, and supports the creation of services that combine external customer supplied components with internal enterprise capabilities.

The Enablers and Components subsystem 14 provides commonly used functions for reuse to reduce risk, complexity and resources required to development new application capabilities. Enabler functionality is wrapped with SOA APIs which are stored in 42 and accessed via 58.

The SLEE subsystem 12 makes it possible to rapidly deploy new services by supplying a highly available computing infrastructure that provides the hardware and system software needed to run a service. The SLEE subsystem 12 preferably includes computing servers 18; operating systems; application servers 20; load balancers 22; routers 22; firewalls 22; Virtual Local-Area Networks (VLANs) 22; Virtual Private Networks (VPNs) 22; databases 24; Storage Area Networks (SAN) 26, which may consist of an enterprise network-attached storage (NAS) 15, enterprise block storage 17, and tape backup 19; and management systems needed to deploy, maintain, and operate a service. A utility computing version of the SLEE subsystem preferably provides a shared computing environment, reducing the time needed to deploy new services, improving utilization rates, and further reducing capital and operating costs.

The major subsystems of the SDF work together. Framework standards and requirements at each major subsystem level enable the SDF to use the most appropriate technologies from conformant vendors and frees the SDF from dependence on any single vendor.

Application Creation and Deployment Environment

AOs are of primary importance to the SDF. Useful customer facing network and application capabilities are preferably packaged as AOs and depend on base level functions and capabilities available as enablers. Enabler functionality is preferably encapsulated by SOA APIs and is accessible via a design time repository or library 42. At runtime, enabler functionality is invoked via a logical converged services bus 30. Examples of enabler functionality include base level functional implementations of presence 27, call control or Parlay-x 29, security 31, location 35, data management 23 and other enablers 25. The data management enabler 23 provides access to an external High Availability (HA) database 39. To ensure interoperability and manageability, the SDF and the Application Component Model upon which AOs are based, specify requirements for protocols, generation of alarms, billable events, and functional APIs and GUIs spanning ordering, provisioning, configuration, monitoring, inventory, billing, and the like. Compliance with these requirements transforms AOs from generic applications into reusable Service Delivery Framework components (i.e., AOs). The Application Creation and Deployment Environment subsystem 16 manages these components and makes it possible to combine and compose them to define new AOs and service offers. Further, AOs preferably generate framework-required usage and fault events. This enables consistent billing for enterprise services, the ability for enterprises to bill on behalf of third party service providers, the ability for enterprises to provide revenue splits to application creators, and the ability for enterprises to provide customer care on behalf of third party service providers.

One major function of the Application Creation and Deployment Environment subsystem 16 is the partner gateway 41 that, in conjunction with 32, supports customer and third ($3^{rd}$) party arty access to enabler APIs. This is also shown as 32 in FIG. 2. A set of APIs preferably provides access to enabled applications. These APIs preferably allow partners and customers to create custom AOs that use the powerful communications capabilities encapsulated by the enablers. The partner gateway 32 in FIG. 2 preferably validates identity, enforces access rights, and protects enterprise resources from break-in attempts, invalid commands, and overloads caused by malicious or runaway processes. The partner gateway 32 in FIG. 2, also shown as the External Application Gateway (EAG) 41 in FIG. 1, also enforces and monitors service level agreements. The partner gateway 32 preferably supports the Session Initiation Protocol (SIP) EAG, which allows customers or third ($3^{rd}$) party arty SIP application servers to access enterprise capabilities using a protocol, such as Parlay-X. Other web-service-based APIs may also be supported, such as Common Object Request Broker Architecture (CORBA), Web Services APIs, and other protocols, where necessary. Web 2.0 techniques conforming to framework usability and user interface standards are leveraged at the presentation layer to make user-facing functionality consistent and intuitive.

Another function of the Application Creation and Deployment Environment subsystem 16 is the application creation feature 34, which enables partners and internal developers to rapidly create and modify AOs. A variety of application creation environments can be used including: the standard development environments, such as Eclipse® and Visual Studio®, that enable programmers to create applications, to access and interact with the enabler SOA APIs; rules engines, such as ILOG® JRules that automatically invoke enabler APIs and other business logic when certain conditions are met; standard graphical orchestration environments, such as a Business Process Execution Language (BPEL)-created Business Process Management (BPM), which encode long running business processes that interact with enabler APIs as specified in process templates; and new graphically oriented interactive development environments that use graphical representations of the AOs to increase the amount of reuse and reduce the time and cost of application development.

The offer management portal 36 is another function that allows product managers, through a GUI wizard, to create customer facing service offers in two steps. First they create products based on one AO, configuring and assigning rate plans to the configurable attributes of the AO. Second, they bundle one or more products and other service offers into service offer bundles associated with promotions and discounts. SDF AOs, products and service offer bundles are registered in the SDF product catalog/Application Registry. While application creation requires a developer to traverse a software development lifecycle (SDLC), product and offer creation involves configuration and preparation of marketing collateral under the guidance of a GUI wizard. The relative ease of product and offer creation speeds service offer creation, dramatically lowers cost and facilitates offer experimentation. The offer management portal 36 is preferably limited to aggregation, configuration, and manipulation of existing AOs and is not aimed at the creation of new AOs, which is handled by the application creation feature 34.

A subscriber portal 38 also known as a management portal, preferably allows subscribers, or Care Agents, to activate, configure, control, manage, monitor and pay for their SDF service offers. The subscriber portal 38 preferably provides users with a unified view of their offers and services. By leveraging common enablers, changes made in one context, such as to the address book, can be automatically propagated to other offers that depend on that context. AOs register URL pointers in the Application Registry 56 to implementations of standard OSS/BSS functions required by the SDF Application Component Model. These pointers create a layer of indirection and loose coupling between the OSS/BSS implementations behind AOs and the Subscriber portals that need to access them on behalf of users. These features enables a variety of existing or legacy subscriber portals 38 to present service offers based on AOs to their users without the necessity of hand coding or hand wiring AO implementation APIs to each portal which is the traditional practice. This makes SDF service offers are instantly viewable, orderable, and manageable as soon as they are registered in the SDF product catalog/Application Registry.

Repositories

The SDF preferably utilizes three key repositories to support the SDF goals of application creation, offer creation, and subscriber portal.

Figure 3:
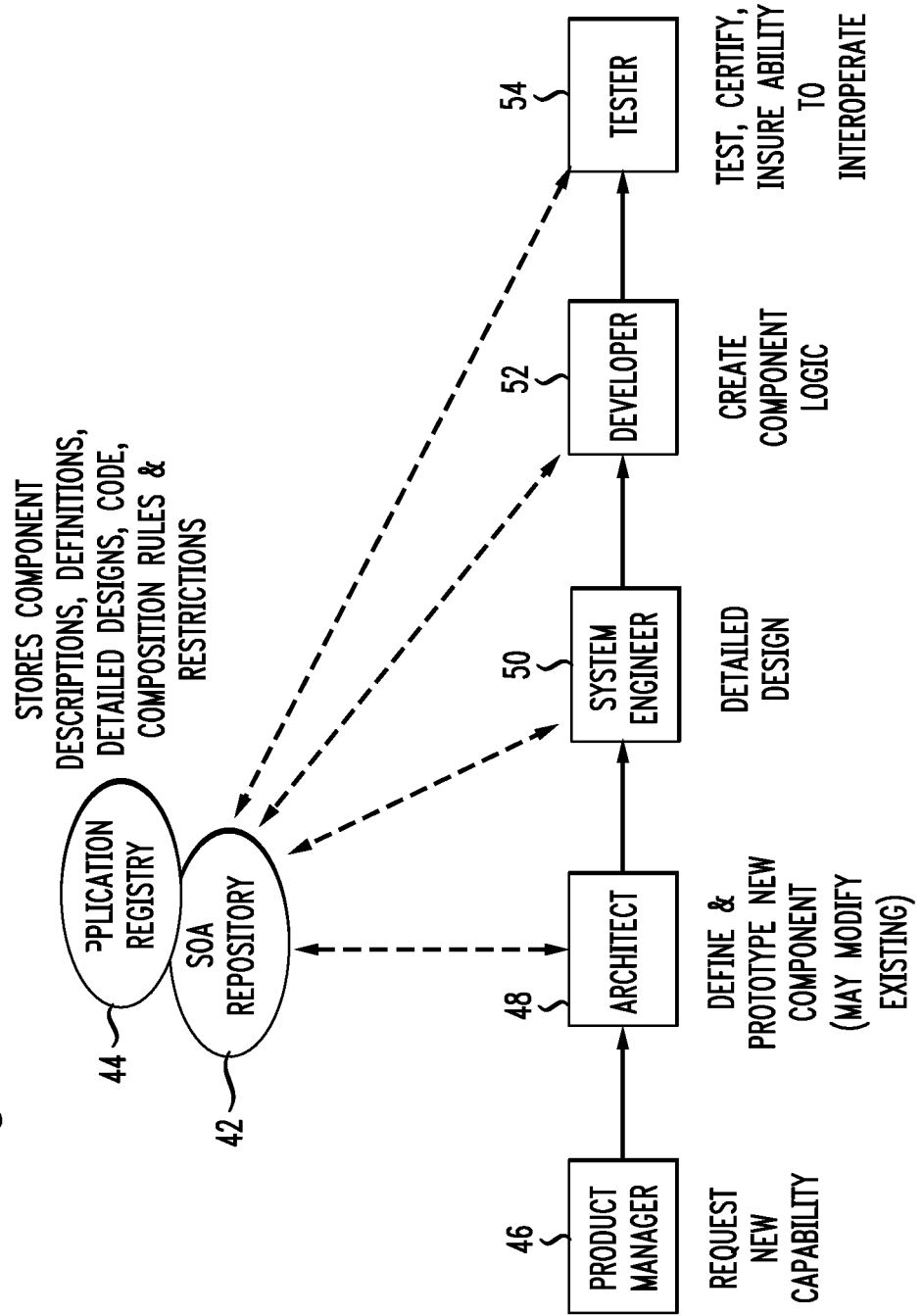
FIG. 3 is a block diagram of an SDF process to create AOs [Rename the SDF Object Repository to the Application Registry].

FIG. 3 shows the SOA repository 42 that is used by system engineers 50 and developers 52 at design time to discover and reuse enabler functionality as part of creating new AOs. The SOA repository 42 fully describes the service oriented APIs of all enablers and includes functionally oriented search tools. This repository can be used by a graphical Application Creation Environment (ACE) to construct new applications. This repository provides search capabilities so that engineers 50 and developers 52 can easily locate the right enabler for a job The SDF object repository 44 also known as the Product Catalog/Application Registry is preferably a library of SDF AOs, Products and Offers, which combine GUI views with programmatic APIs spanning the basic runtime functionality of customer facing applications, as well as OSS/BSS 40 functionality required to support their ordering, configuration, provisioning, inventory, service assurance, and billing. The SDF object repository 44 describes each AO's capabilities and each Product and Offer configuration and provides search capabilities so that Product Managers 46, engineers 50 and developers 52 can easily locate the right AO, product or offer for a job.

Figure 4:
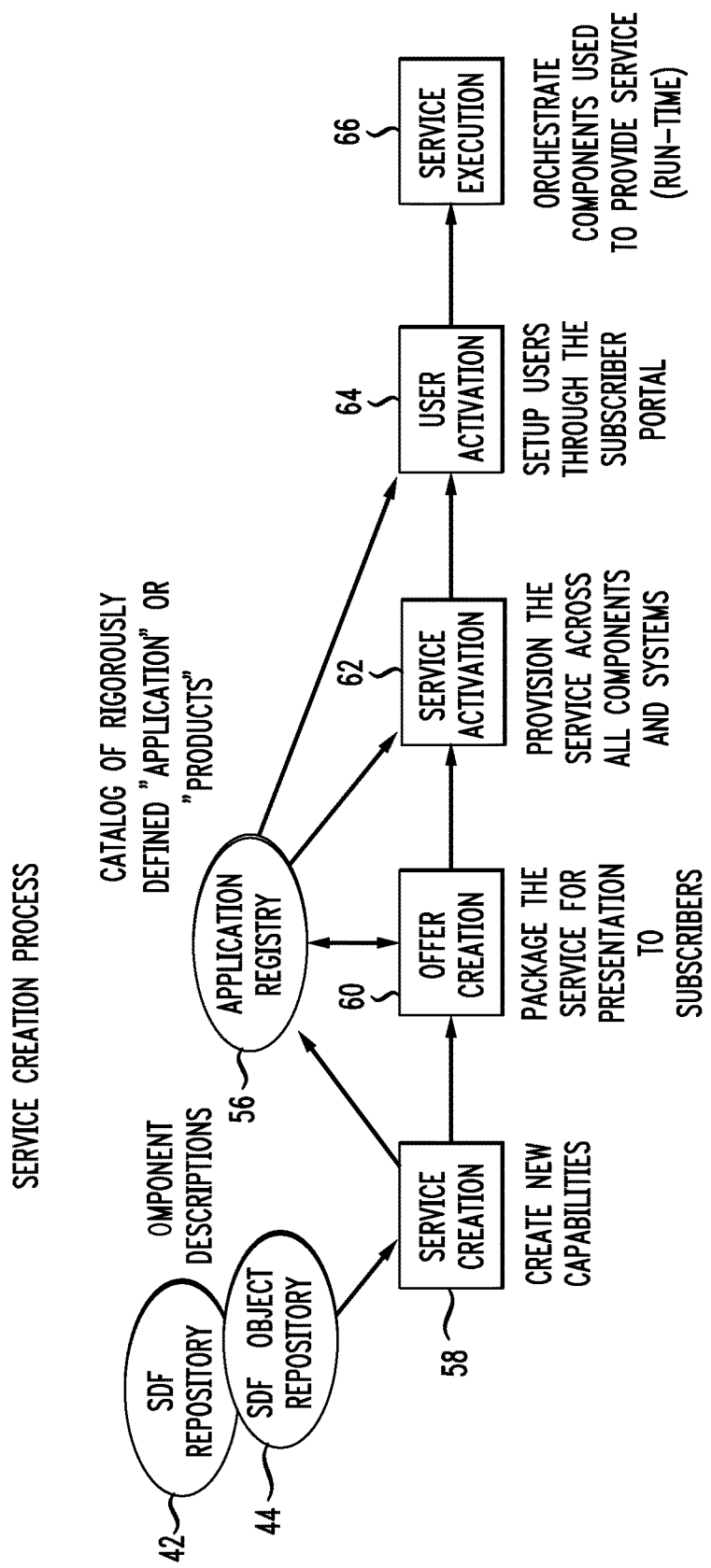
FIG. 4 is a block diagram of an SDF process to create customer facing service offers.

FIG. 4 shows the SDF product catalog (or application registry) 56, which is a catalog of rigorously defined AOs along with configurations of those AOs that have been promoted to the status of SDF products or offers. Both the offer management portal 36 and subscriber portal 38 use the SDF product catalog/application registry 56 to automatically display and manipulate products and offers, which eliminates the conventional need to hand code offer bundles and integrate their presentation at the portal.

SDF Processes

The SDF supports a new Application Object (AO) creation process, so that if a required capability does not exist, the product manager 46 can describe its function and request that it be created, as shown in FIG. 3. Architects 48 review the request and define a new AO, ensuring that the new AO 1) can be quickly implemented and has simple, but powerful, APIs; 2) is broadly reusable and will fill the needs of multiple services; 3) can interoperate with other services, is forward-looking and is likely to be a long-lived capability; and 4) meets all SDF requirements. Architects 48 may prototype the new AO to refine its design and validate that the AO is broadly reusable. System engineers 50 may define the details of the new AO, the developers 52 may create the new AO, and the testers 54 may certify that the AO performs as required and interoperates with other components.

As the SDF shown in FIG. 4 evolves, it preferably supports highly automated service offer creation processes, such as product creation 58, offer creation 60, service activation 62, user activation 64, and service execution 66.

In the product creation function 58, by using a GUI interface, a product manager 46 preferably creates a new product by selecting and configuring an AO, including supplying marketing collateral and other screens if needed for that product. In function 60, the product is optionally bundled with other products or offers, and is associated with promotions and discounts. The products and offers may be staged by the Product Manager and when they are satisfied with them, published in the Product Catalog/Application Registry 44. This effectively activates the service 62, and enables users to use the service 64 by virtue of the subscriber portal's integration with the Product Catalog/Application Registry.

In service activation function 62, the scripts and logic created during AO development are automatically leveraged by the new products and offers that were configured from the AO in functions 58 and 60. These AO scripts and logic are encapsulated by AO views required by the SDF Application Component Model (ACM). The implementation of these views is done on the systems of the OSS/BSS Provider supporting the AO and include all the necessary scripts and logic required to provision network and application components that the AO depends on. For example, a Home Subscriber System (HSS) may be provisioned to recognize the service. The AO views themselves leverage technologies like JavaScript and HTML to generate the view's presentation layer in accordance with SDF usability and user interface standards. The AO would already be deployed on an execution environments but additional capacity would be provisioned as necessary to support the anticipated capacity needs of the new service.

In the service instantiation/user activation function 64, as a result of user interaction with the AO ordering view for the offer, via the subscriber portal 38, scripts and logic encapsulated by the ordering view are preferably run to provision the user, setup user accounts, profile, billing information, and the like.

In the service execution function 66, various component and system APIs necessary to support the operation of the service at runtime are invoked, as designed and implemented by the AO application creators. Their application logic may depend on the runtime execution of enablers and network components like the Serving-Call Session Control Function (S-CSCF), the Service Capability Interaction Manager (SCIM), or other systems and applications. Exact implementation behavior is preferably defined during the service creation step 58.

Common Enablers, Components and Technologies

The SLEE subsystem hosts many enabling services. These services, such as a messaging, presence, location, identity management, notification and the like are preferably available to both enterprise and third party applications.

Component and enabler functionality may be accessed via web services, CORBA, SIP and/or other protocols. SIP is used to preferably communicate with capabilities part of or closely associated with the Internet Protocol Multimedia Subsystem (IMS). However, components and enablers preferably use web services to expose their functionality. Similarly, the OSS/Business Support System (BSS) 40 shown in FIG. 2 preferably communicates with components and enablers using web services.

The uniform data management functions 23 preferably provides common APIs to a variety of data stores. The APIs preferably hide the details of the underlying schemas and allow the databases to change without affecting the consuming applications. Both web services and higher performance APIs (such as CORBA) will be supported. Applications can create data replicas, which can be accessed directly via Lightweight Directory Access Protocol (LDAP) and Structured Query Language (SQL), when the data management APIs do not provide the required flexibility.

The component library 21, or code library, preferably encourages code reuse. Applications, enablers, and components preferably have access to libraries, such as JavaBeans®, C subroutines, and the like, that implement commonly used functions.

Enablers preferably support composition. The fully developed service creation process utilizes basic building blocks called enablers. Rather than re-creating commonly used capabilities, different Application Objects (AOs), which form the basis of service-offers, services can be constructed from these building blocks. AOs are designed to implement the functionality of customer facing services. Each AO preferably includes (1) runtime application or service logic (SIP servlet) which implements specific capabilities (e.g., universal messaging) which is typically driven by user and system provided data; (2) required OSS/BSS functions encapsulated by a URL referenceable presentation layer, which provides a web interface for users and system administrators to enter and change data, and that appears under the direction of a management portal application running on the user device or on a central server (e.g., a service provider's web server) (in the case of the universal messaging capability described above, the presentation layer preferably allows the user to order and configure their messaging service, check their capacity, usage, service level agreements and perform other management and monitoring tasks). The implementations behind these required OSS/BSS functions encapsulate the code and logic that performs provisioning, fault management, ticket creation, inventory management and other backend OSS/BSS functionality; 3) events, such as usage, capacity, availability, performance, service level agreement, etc. in SDF standard formats including required information such as service provider, application, end-user and device type identifiers; 4) configurable and ratable attributes that enable Product Managers to customize AO behavior in the form of Products associated with defined rate plans and further bundle these products into offers associated with discounts and promotions. End-users subsequently subscribe to these offers and since their identity is known at runtime, the AOs underlying the offers are able to give them the behavior (e.g., quality of service and range of features) that the Product Manager associated with the offer that their identifiers were associated with through the ordering and provisioning process.

An AO, also known as a CARTS Application, is an application designed to be presented to customers, and other types of users (such as Care Agents), complete with required ordering, billing, care and other functional GUIs and APIs. One of the deficiencies of current Web 2.0 component models on the web (e.g., Google® gadgets and Microsoft® gadgets) is that they do not support complex ordering, management and monitoring in their component models. The disclosed embodiments, on the other hand, support such capabilities and by doing so, enables revenue splits to application creators, oss/bss providers and service providers in the context of a novel services marketplace that benefits all parties and facilitates innovation.

In the SIP servlet container, the preferred environment for implementing applications, enablers, and components is Java®. Java® application servers (typically WebSphere®, WebLogic® or open source versions like JBOSS) are widely used to provide web application based on HTTP. New versions of the same application servers preferably allow Java® developers to create applications that support both HTTP and SIP capabilities. SIP servlets provide the advantage of (1) compact code, because SIP servlets are highly efficient; (2) efficient execution, because benchmarks and test programs have shown SIP servlet containers can be extremely efficient; (3) efficient development, because SIP servlet development utilizes the same programmer skills and rich tool set used for developing Java® based HTTP applications, and the Servlet container simplifies development by hiding the complexities of SIP from the programmer; and (4) integration with HTTP applications, because a single program or servlet can handle both SIP and HTTP. Therefore, developing converged applications is straightforward.

At service design time, the application creation team decides which of various methods will be used to orchestrate the behavior of the components associated with the application. The S-CSCF is one method. Based on attributes of the call (i.e., caller-ID, dialed number, and the like) the S-CSCF, which is a part of the IMS core, routes the SIP INVITE, which is the message used to establish an SIP session, to the appropriate application component. When the application component needs to pass on the call, the S-CSCF is called again to determine the next application component to which the SIP INVITE is to be routed. The S-CSCF can also manage simple sequential routing chains. The SCIM is a second orchestration method. Logic is required to select the next application server in the routing chain, and when this logic is too complex for S-CSCF, a SCIM may be used. Finally, traditional code within an application server is the third method of performing orchestration. This method is preferred when there is routing logic that may require access to enterprise and customer databases or to external web services. Application servers that can consult any enterprise or external component can also be used to perform routing and orchestration functions. Application server logic can be written using $3^{rd}$ Generation Languages like Java or via graphical development environments like BPEL (Business Process Execution Language).

Service Logic Execution Environment (SLEE)

Moore's law has fueled the information economy for the past forty (40) years. The rule specifies how quickly chip densities increase, but it effectively means that the underlying price-performance of computing technology doubles approximately every eighteen (18) months. This has several significant implications for communications applications. First, computing hardware that is three (3) years old can be replaced for about twenty-five percent (25%) of its original cost, or newly purchased equipment will be about four-hundred percent (400%) more powerful than the old equipment that it replaces. Next, equipment can lose four percent (4%) of its value every month. Installing equipment even a few months before it is needed can significantly increase costs. Long provisioning cycles and conservative demand forecasts result in unused/idle capacity whose value may never be recovered. Also, equipment based on commodity servers delivers superior price-performance. Vendors of commodity servers refresh their product lines several times a year, incorporating the latest, most cost-reduced chipsets. Further, software and management costs often track Moore's law. Thus, as processors get faster, fewer systems are required to process the same load; hence software and management costs are reduced.

Moreover, service architectures are preferably able to use Moore's law. Vendor and equipment purchase commitments are often made years before a service is fully available. Typically, the bulk of service capacity is installed in the out-years. Thus, to remain competitive, a service architecture is preferably able to use continuing improvements in price-performance, either to reduce the cost basis of the service or to deliver greater function ability to users. Equipment vendor and systems integrator solutions typically lag and do not keep pace with Moore's law. Components are refreshed less frequently and, as a result, solutions are based on older technologies that deliver inferior price-performance.

Utility computing has the potential to dramatically change the economics of the service delivery infrastructure and harness the power of Moore's law. Instead of building dedicated application infrastructures for each service, a single geographically-distributed shared infrastructure provides the resources to run all services. There are key economic advantages of utility computing. First, there is efficient use of capital. A large shared infrastructure eliminates duplication and reduces unused resources. It averages demand across multiple services, smoothing load peaks and ensuring high utilization rates. New capacity can be provisioned in a matter of minutes, so it is not necessary to order and install equipment long before it is needed. As a result the latest most cost-reduced technology can be leveraged. Second, traditional capital items behave more like variable costs. With a shared infrastructure supported by automated provisioning, it becomes cost-effective to replace equipment after only a few years of service. Capacity can be closely matched to demand.

The SLEE subsystem 12 preferably allocates computing and network resources and supports the deployment of logically independent test environments used by the Application Creation Environment, 58. Later, when the application is ready to be made available, additional resources will be taken from inventory and the production environment is created. As a part of the service activation function, resources are preferably automatically provisioned. The service logic, which provides the real-time aspects of the service, and the user enrollment, control, and billing AO views are created by the Application Creation team during the development process (i.e., during Application Creation). As customers enroll in the service via standard AO subscribe views, the appropriate provisioning flows behind the implementation of those views are automatically executed to create the customer's account, assign resources, and the like.

The SLEE subsystem 12 preferably provides a shared utility computing infrastructure for enterprise components, enablers, AOs and the products and offers derived from them. It is not necessary to create separate physical infrastructures for each application; rather virtual environments within the physical infrastructure are created. Hardware and software resources, such as servers, operating systems, Java® virtual machines, load balancers, firewalls, VLANs, VPNs, routers, and the like are preferably allocated to each application enabler and component, creating logically separate, independent virtual environments. Enterprise highly automated operational systems preferably create the virtual operational infrastructures, and are responsible for deploying and operating the application. As application load changes, the SLEE subsystem 12 dynamically increases or reduces the computing and network resources allocated to the application. The SLEE operational environment is preferably secure and fault tolerant. The SLEE subsystem 12 is logically a single environment. However, it preferably spans multiple data centers, and is preferably able to provide continuity and disaster recovery while ensuring that both processor and network capacity are available to provide the required performance, and meet peak demands. Even though the SLEE subsystem 12 is a shared infrastructure, product managers 46 and operations personnel preferably have full visibility to the dynamic state, including load and performance data of each application (via standard AO views), and continue to retain the control needed to ensure that each application performs according to expectations.

The SLEE provides numerous advantages, which will now be discussed. Capacity is available on demand since the SLEE subsystem 12 dynamically deploys servers 18, 20 and associated resources 22 (i.e., load balancers, firewalls, VPNs, VLANs, routers, working storage, and the like) to meet the requirements of the application. As demand increases, the SLEE subsystem 12 preferably automatically deploys more servers and other resources to satisfy that demand. As load drops, the number of resources 22 allocated will be reduced. Hence, it is no longer necessary to purchase and install the computing resources required to handle peak loads that may only occur a few hours a year.

Availability preferably remains continuous since the SLEE subsystem 12 is highly reliable. For example, multiple servers can be deployed within a single hosting center, and servers can be deployed at multiple centers. The loss of a single server, or even the loss of an entire hosting center, can be handled since the enterprise network routes traffic to servers and data centers that remain operational. When a failure occurs, new servers can be dynamically allocated to provide protection against additional failures. A large common infrastructure makes it possible to justify the cost of multiple hosting centers. Because disaster recovery is based on an N+1 model, the availability of additional hosting sites further reduces the extra idle capacity needed for disaster recovery. For example, a disaster recovery deployment based on two (2) sites requires one-hundred percent (100%) idle capacity, a deployment based on five (5) sites only requires twenty-five percent (25%) idle capacity.

Costs are preferably allocated to applications based on the capacity used or reserved. Because infrastructure is shared, capital does not need to be purchased in advance for each service. The economic penalties associated with accelerating, delaying, or even canceling the deployment of a new project are significantly reduced, as are the risks associated with deploying a new application that might experience unpredictable demand.

Performance is preferably optimized since the SLEE subsystem 12 deploys servers where they are needed to improve performance. Global services may be receiving requests from around the world, and as the sun moves, the source of load will shift, from, for example, Europe, to the Americas, to the Far East. To meet this shift, the SLEE subsystem 12 can preferably automatically deploy servers in the United States while reducing capacity in Europe, then later in the day begin to deploy servers in Asia while reducing capacity in the U.S. To guarantee response times and handle expected peaks, capacity can be reserved and dedicated to particular applications.

Test, development, and production systems can all make use of the same shared physical infrastructure. Separate virtual environments are preferably created and dynamically sized as needed. Thus, at off-hours, excess capacity can be allocated to test, and during failures, development capacity can be used to meet production commitments.

Customers preferably retain full control of the content of their applications, which can continue to be created either by in-house developers, by consulting firms that have extensive enterprise or industry specific expertise, or by Independent Software Vendors (ISVs).

The SLEE subsystem 12 preferably operates within a shared infrastructure to minimize cost and achieve maximum reliability. To ensure security and privacy, each application is dynamically assigned to a separate VLAN. These private VLANs may also include secure VPNs to securely connect with databases and other resources operating in a enterprise data center. The SLEE subsystem 12 preferably incorporates the most current security technology, such as application-level firewalls, Secure Sockets Layer (SSL) accelerators, and intrusion detection systems.

Figure 5:
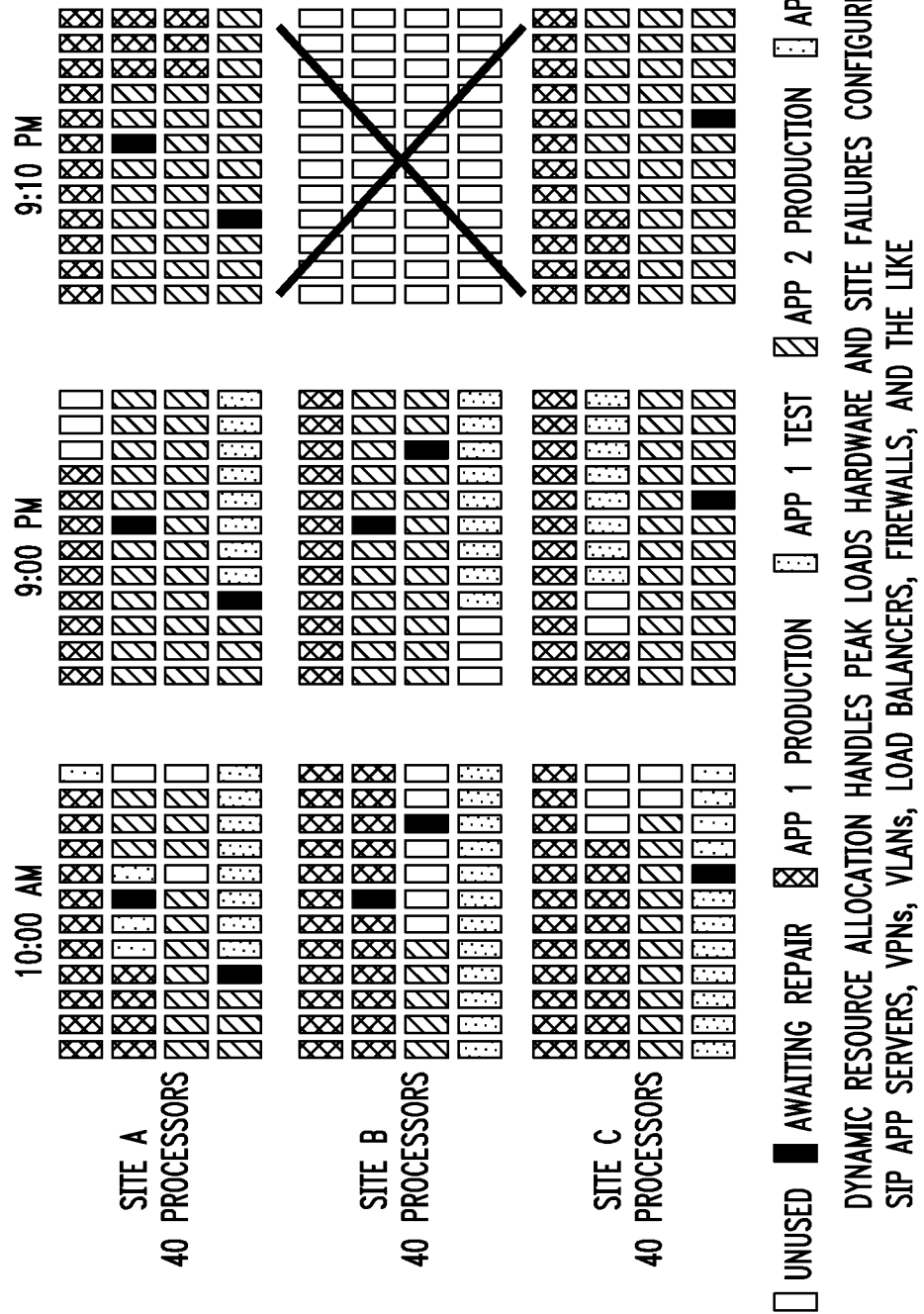
FIG. 5 shows dynamic resource allocation in a Service Logic Execution Environment (SLEE) utility computing environment subsystem.

Servers and other components are preferably automatically provisioned. Change management, hardware provisioning, and software patch management are preferably handled by the utility computing environment. FIG. 5 shows how the usage of servers at three different locations changes during a twelve-hour period. The dynamic resource manager preferably responds to changes in load and can take an unused server from inventory, or repurpose a running server and place it in production in a short period of time, such as minutes.

Aggregate demand is constantly monitored and predictions of future load are continually updated. When additional resources are needed they can be automatically ordered and quickly installed. Turning up a component is preferably a fully automated process; the new hardware is discovered, tested, and added to the production inventory. Typical servers are 1U format "pizza box" Intel® processors, which are available with short delivery cycles. Since the infrastructure is large and load is predictable, capacity can be closely managed.

The SLEE subsystem 12 provides a utility computing environment, shown in FIG. 5. The single infrastructure provides production, test, development resources. The SLEE subsystem 12 provides logically separate environments to each application, and when failures do occur, the dynamic resource allocation provisions new resources and shifts load, providing high availability and disaster recovery.

Service Logic Execution Environment (SLEE) For Customer Applications

The ability to support non-enterprise applications from customers and third (3$^{rd}$) parties is an important capability. Though customer applications may reside in a customer's data center, the enterprise preferably provides a special SLEE subsystem to host customer applications. Like the enterprise SLEE subsystem, the customer SLEE subsystem preferably provides a utility computing environment and External Application Gateways (EAGs).

Like the enterprise SLEE, the customer SLEE subsystem preferably provides the computing resources needed to deploy and operate an application. Customers preferably have full access and control over their application, even though it is running in a shared environment. Security is guaranteed and dynamic resource allocation ensures that the application has the computing and network resources needed to provide the appropriate level of service. Like the enterprise SLEE, the customer SLEE subsystem provides fault tolerance and disaster recovery, if desired.

The SIP EAG and Parlay-X gateways, such as web services, preferably allow customer applications running in the customer SLEE subsystem to access a variety of enterprise services. Customers need only create their unique custom logic, and they can use powerful enterprise services to complete their application.

For customers, the SLEE subsystem provides several advantages. First, enterprise SLEE handles operations by ensuring that the infrastructure is secure and the necessary patches are applied, providing capacity as needed, upgrading technology, and creating resiliency that provides true business continuity. Second, enterprise SLEE provides common services, such as a rich set of IMS and enabling services. The customer's developers can focus on enterprise or industry specific logic. Next, the customer's technical personnel can be focused on developing systems that deliver business value, not on creating and operating infrastructure. Since the enterprise preferably updates the platform by incorporating the latest, most cost-reduced technology, there is also a protection against obsolescence.

Voice-Over-Internet Protocol (VoIP) Service Composition

As an example of service composition, suppose a user does business in New York, Los Angeles, and Hong Kong. The user has three phone numbers so the user's customers can place local calls. These calls may be picked up on any phone the user specifies, such as a cell phone, work phone, home phone, remote office phone, guest office phone, or on a softphone running on the user's PC. If the call is not answered, it is handled by a business quality voicemail system. Outbound calls can be placed using the PC-based softphone at advantageous rates. The PC softphone allows the user to talk over a phone that provides higher quality than a cell phone while avoiding expensive charges, such as hotel room charges. The features the service provides include: (1) one or more telephone numbers (TNs) in the area codes of the customer's choice; (2) incoming calls that can ring on any phone; (3) simultaneous, sequential, and overlapped ringing that can be specified; (4) the ability to place and receive calls using a PC based softphone; (5) inexpensive, high-quality domestic and international calls from the PC softphone; (6) business quality voicemail; (7) an address book; and (8) credit card billing.

The product manager 46 preferably starts the product/offer creation process 60 by entering basic information about the new service using, for example, a graphically oriented wizard 68, as depicted in FIG. 6. The graphical Product/Offer Creation Environment displays a list of available AOs and Products that can from the basis of new Products and/or service offers. In FIG. 7, the product manager 46 preferably selects and configures the AO configurable attributes 70. Next, in FIG. 8, the product manager views the appearance of the standard views in a staging environment, adding introductory, explanatory screens along with terms and conditions and other marketing collateral as desired.

Figure 9:
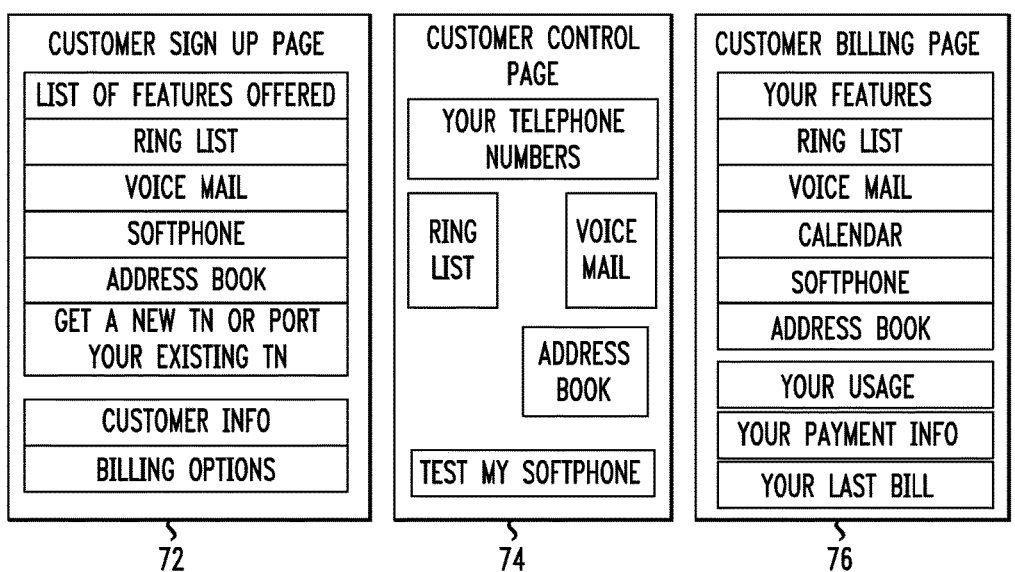
Figure 10:
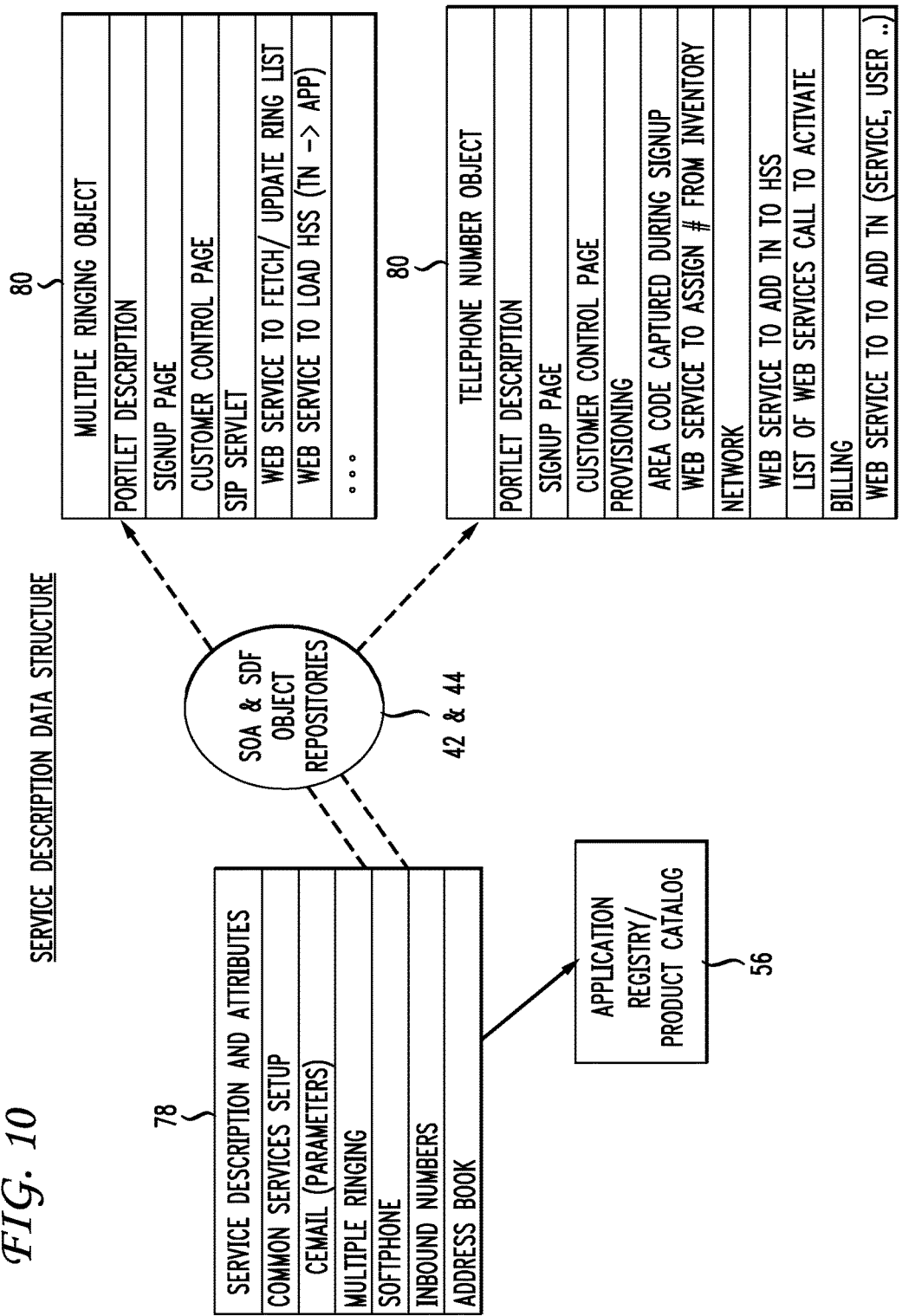
FIGS. 10 and 11 show examples of how reusable components from a SOA Repository are used to support the definition of an AO stored in an Application Registry.

The customer sign up screen 72 is the standard subscribe view required of all AOs. Depending on the context, this same view allows users already subscribed to the AO to control and configure the behavior of their service 74. Usage and billing information 76 is provided via another standard AO view. As the product manager 46 creates offer bundles, the product manager decides for each standard view, the order in which product views within the bundle should be presented to users, and whether they should be preceded or followed by introductory, explanatory or other marketing screens. Further, the product manager 46 can view the result of their work in the staging environment as shown in FIG. 9. The new service offer 78 is registered in the application registry 56 and the enabler components 80 of the new service offer 78 are described in the SOA 42 repository 44, shown in FIG. 10.

Figure 11:
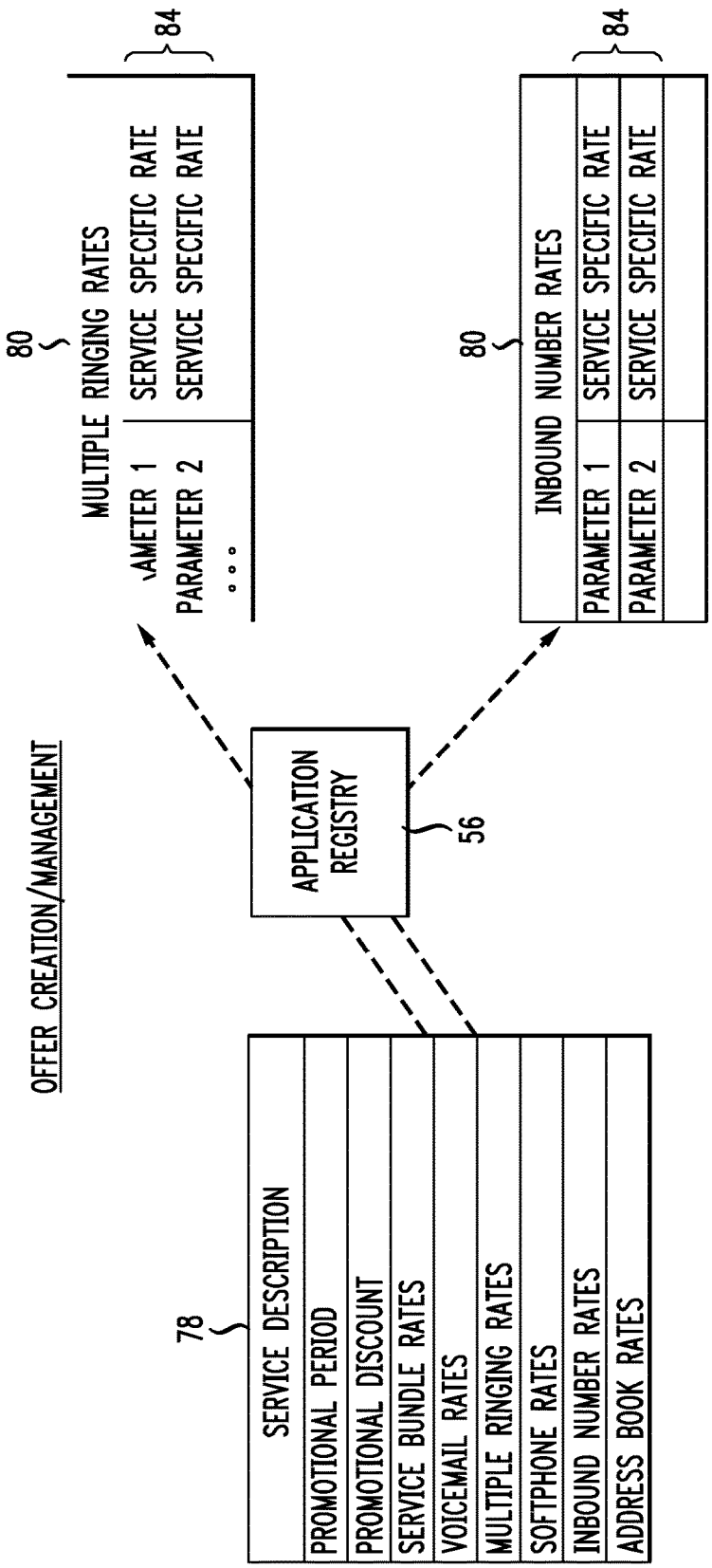
Figure 12:
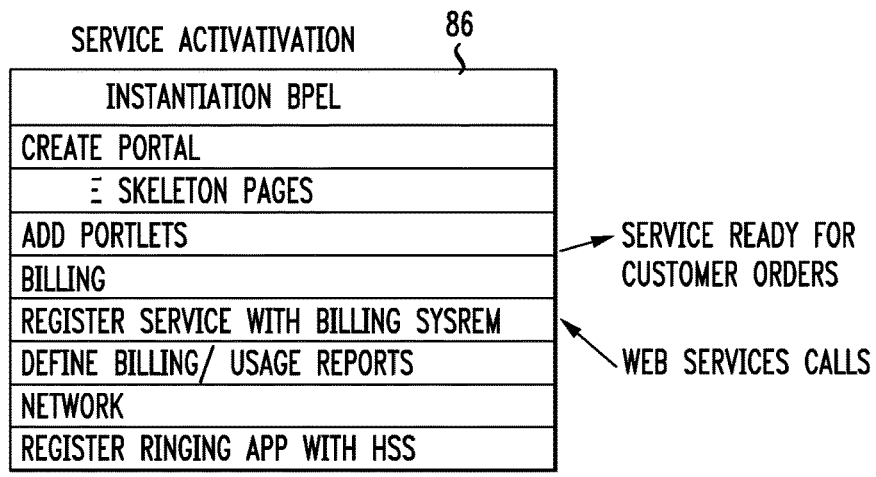
FIG. 12 shows an example of an implementation process behind an AO ordering view, which instantiates an instance of a AO.
Figure 13:
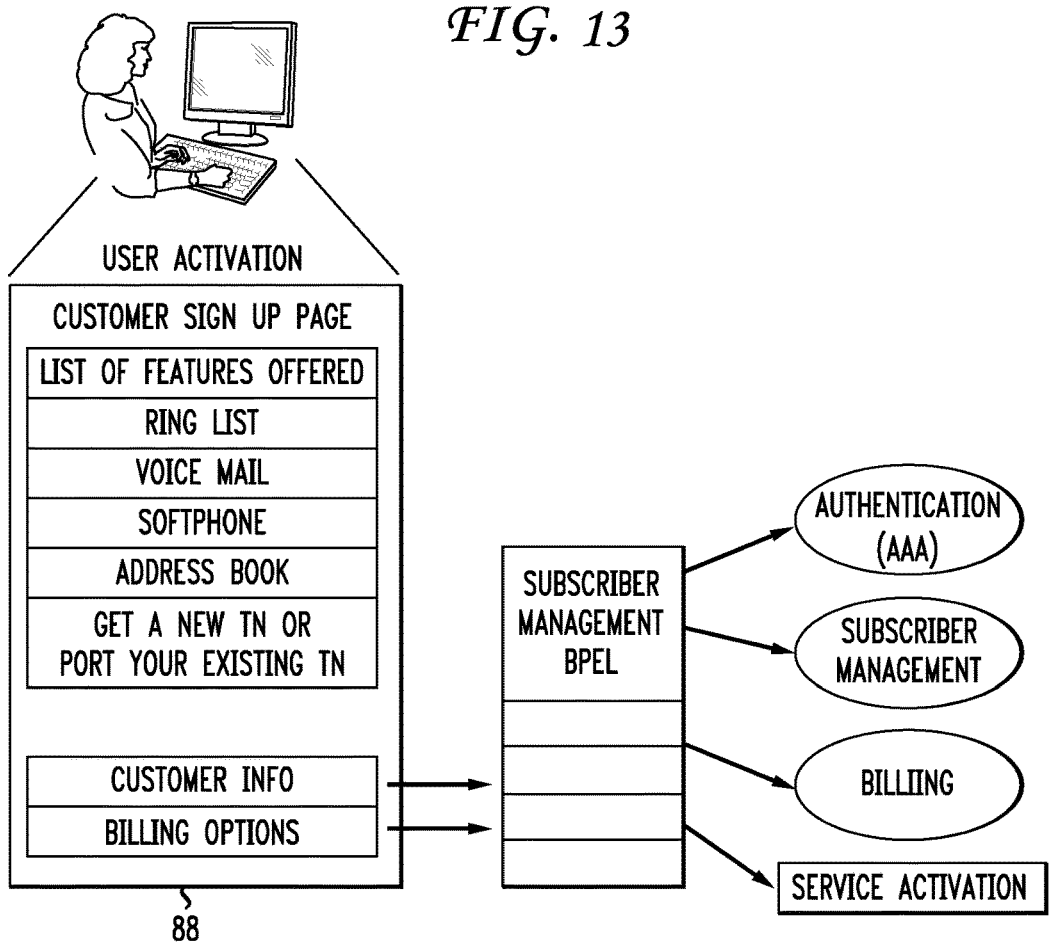
FIG. 13 shows an example of a user accessing an AO ordering view via a management portal to instantiate their service.

In the offer creation step 60, the service is preferably associated with rates 82, discounts and promotions, and optionally packaged with other services and offers 84, as shown in FIG. 11. Next, in the service activation step 62, scripts are run, and all downstream product catalogs are configured to accept the new product/offer along with their rates, discounts and promotions as part of a product catalog synchronization process 86, as shown in FIG. 12. Finally, all components have been provisioned and the service is now ready to receive customer orders. The user activation 64 scripts are run when a customer goes to the subscribe view for the offer, which is also known as the web enrollment page 88 shown in FIG. 13.

Figure 14:
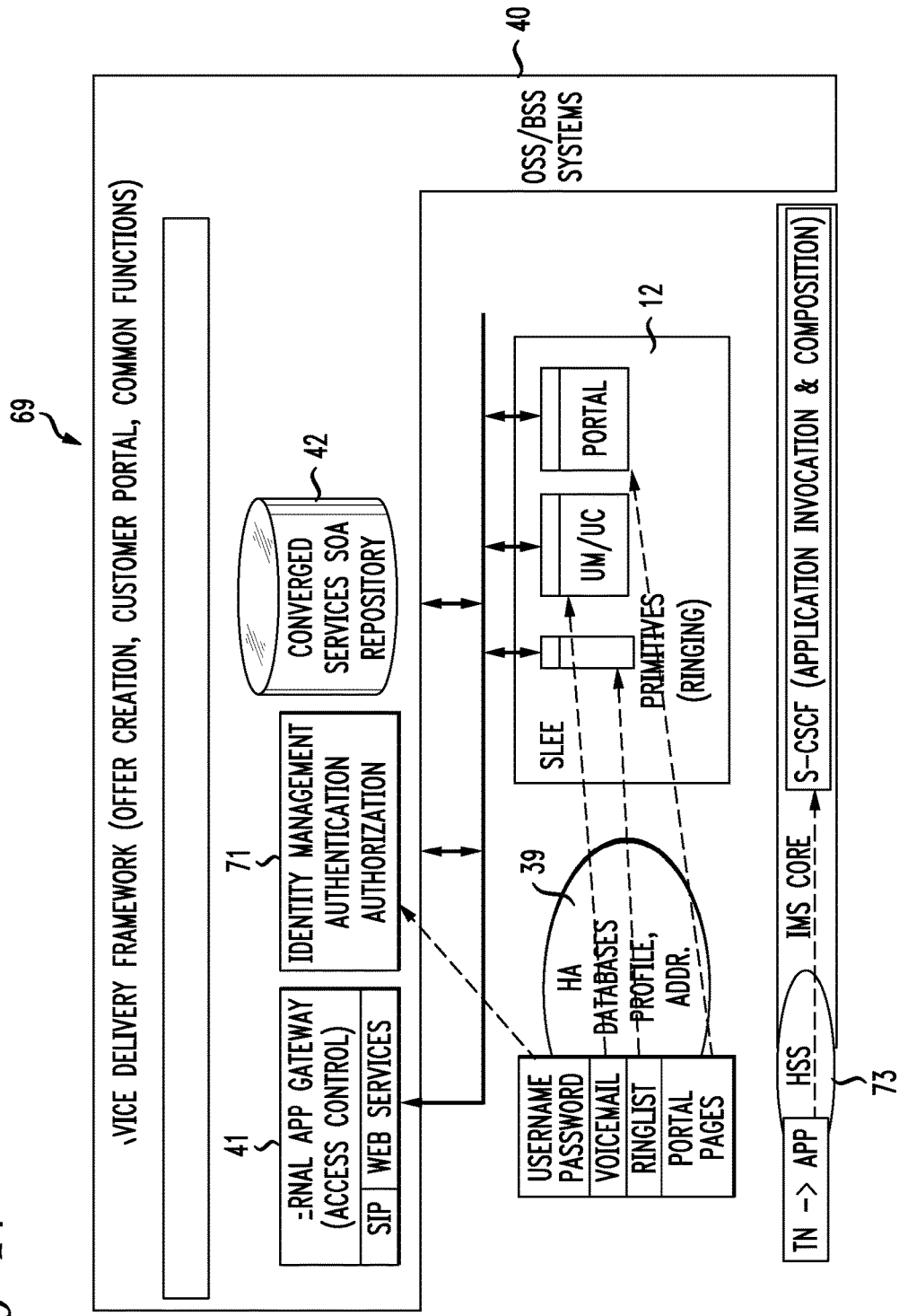
FIG. 14 shows some of the service components being provisioned.

FIG. 14 shows an embodiment of the components being provisioned, both in the applications and in the IMS network. The SDF 69 preferably includes the external application gateway 41; the identity management authentication and authorization subsystem 71, which checks the subscriber's username and credentials; the converged services SOA repository 42; and the SLEE 12, which is accessed from the high availability databases containing the subscriber's profile, address, username, password, voicemail, ring list, and portal pages. The provisioned data is preferably stored in the High Availability (HA) databases 39 and the HSS 73.

Figure 15:
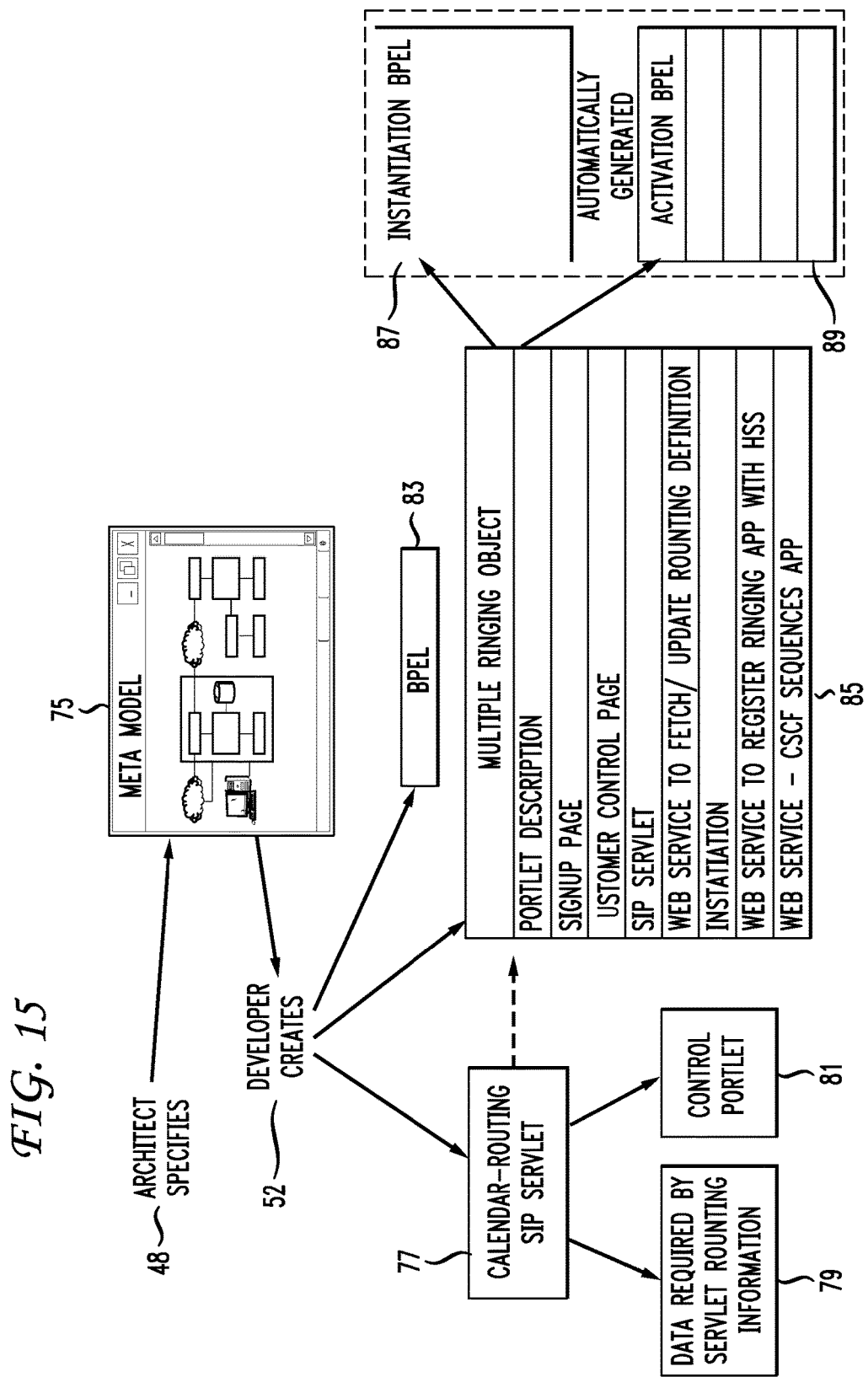
FIG. 15 shows an example of application generation by a developer.

FIG. 15 shows an embodiment for the creation of a new Application Object (AO) that may ultimately be presented to a customer after configuration into service offers. A high-level architect 48 preferably specifies requirements for the AO 75 that are passed to a developer 52. The developer 52 then creates runtime behavior such as the calendar-routing SIP servlet 77, which initiates the routing information of the data required by the routing servlet 79 as well as required AO views such as the control 'portlet' 81, which is an aspect of the required subscribe view. Next, the developer 52 creates provisioning and user interfaces for the runtime behavior. This may include, for example, the multiple ringing object 85, runtime display and configuration pages, SIP servlets and web services involved in routing definitions and their enablement. The developer preferably uses a programming language they are familiar and comfortable with, for example, the Business Process Execution Language (BPEL) 83, which is a standard for developing and representing workflows, or Java. The application creation environment may also automatically generate BPEL processes, Java classes or other programming artifacts such as an instantiation BPEL 87, activation BPEL 89, and the like.

In order to maximize the benefits of the SDF architecture, multiple goals and principles are preferably met. First, it is preferable to eliminate engagement with the Software Development Life Cycle (SDLC) to reduce the time and cost required for service delivery. This may be accomplished by maximizing the use of the product/offer wizard and portal strategy which is targeted for product managers with no development background, and which can support service creation as quick as one service per month to one service per week through configuration, upload of HTML screens and staging of the result. Second, it is preferable to create a library of configurable fine-grained AOs, since fine-grained AOs are more likely to be reusable in different contexts, and reusing their application-centric UIs and APIs reduces service delivery time and cost. Third, Web 2.0 concepts, tools, and technologies are preferably used to create and/or present AO views (i.e., leveraging HTML iFrames™, JavaScript®, JavaScript® Object Notation (JSON), and the like). Fourth, it is also preferable to cater to mash-up developers by offering mash-up capability, which is an application that combines content from more than one source into an integrated experience, creation environment, and/or service registry, with the opportunity to reach a wide customer and service provider base with the potential for revenue sharing. The product/offer creation environment provides a way of supporting this goal for non-developers.

Next, it is preferable to use agile development processes, such as having smaller and faster releases, a compression in requirements and development (such as two-week iterations of code and integration builds every fifteen minutes), and reusing enabler functionality. Sixth, it is preferable to use policies in application implementations by requiring that applications build support for policies in their implementations. Next, it is also preferable to enable resale of enterprise billing and care capabilities to service providers. This may be accomplished by building provider and user identification into AO alarms and usage events, as well as support for these events in back-end billing, assurance, and care systems. It may also prove beneficial to split the support revenue with service providers and/or application developers.

Further, it is preferable that portals collect all information common to offers, such as the account information. This simplifies aggregation by ensuring that enabled applications collect only application-specific information. For yet another goal, it is preferable that portal scripts not recollect information that has already been provided. This relates to fields common to different applications, wherein service information is already subscribed, and to support different instances of the same service with different settings tied to persons of the same billing account. It is also preferable that portal strategy accommodate different kinds of devices, such as web browsers, cell phones, Personal Digital Assistant (PDAs), Interactive Voice Response (IVRs), and the like, and users, such as subscribers, customer care, network operations, service providers, resellers, mash-up developers, enterprise subscribers, small business subscribers, and mass market subscribers. Next, it is preferable that subscriber portal support personalization, such as 'my profile,' 'my look and feel,' 'my service portfolio,' 'my wishlist,' 'potential services for me,' 'reconfiguration based on use patterns,' and the like. It is also preferable that all SDF portals use a common subscriber profile, and that the portal strategy supports display of advertising through subscriber portals.

To further maximize the benefits of the SDF architecture, it is preferable to support product definition by configuring AO attributes. This is accomplished by enabling multiple products to be created from the same AO, supporting rate plan specification, supporting short and detailed descriptions, lead-in and lead-out screens, and terms and conditions. Further, it is preferable to support offer definition by bundling products and other offers into a bundle, and associating the bundle with promotions and discounts, short and detailed descriptions, lead-in and lead-out screens, and terms and conditions. It is further preferable to enable subscribers to configure their own bundles within the constraints set forth by the product managers, and enabling service providers to construct their own products and offers by the service provider.

Next, it is preferable to improve service (i.e., AOs, products and offers, and the like) manageability by using standardized AO views to streamline customer and network care, supporting views by role (i.e., care, subscriber, service provider, and the like), reducing churn, supporting credits when troubles are detected, and adjusting Quality of Service (QoS). Service manageability may also be improved by providing customer with functions, such as 'my Service Level Agreement (SLA),' 'my trouble,' 'my test,' and 'my grievances'.

Further, it is preferable to support subscriber definitions by instilling models that support communities, enterprise account structures, and family structures (e.g., parents and children), as well as models that have community based charging, such as up-selling, and personalized promotions. It is also preferable to support personalization by including customized charging, up-selling, personalized promotions, and functions such as 'my adjustments,' 'my discounts,' 'my charging model,' 'my usage,' and 'my plan'. Next, it is also preferable to support prepaid and postpaid billing models through the portal, and reduce customer churn. This reduction is done by providing credits when problems are detected, adjusting QoS, warning when fraud is detected or users violate policies, and advising of a charge to users before they use a service.

Figure 16:
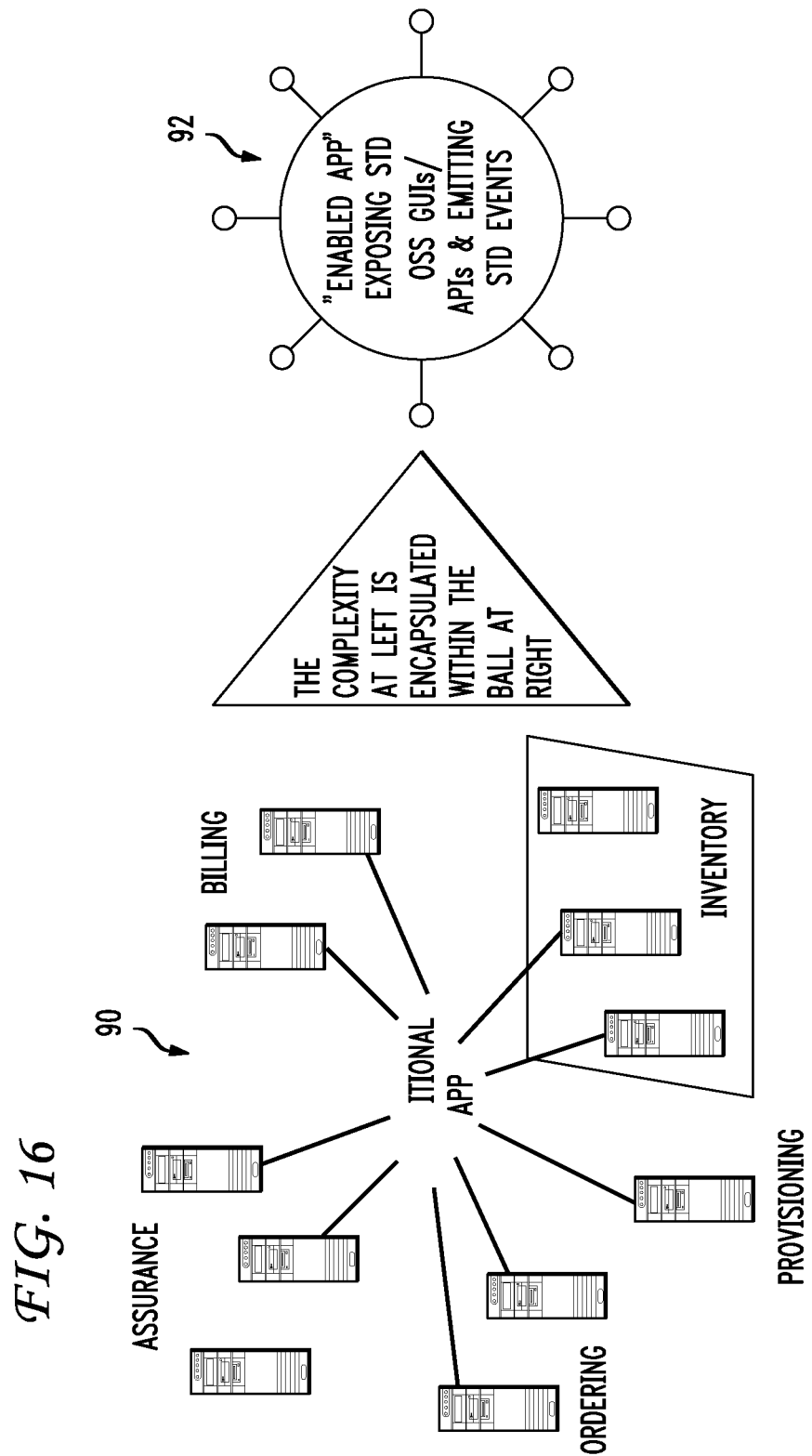
FIG. 16 shows a pictorial representation of the strategy for encapsulating OSS/BSS complexity behind a required set of AO functional views and programmatic APIs in accordance with the disclosed embodiments.

FIG. 16 shows a representation of the strategy for encapsulation of OSS/BSS complexity behind AO object interfaces. Item 90 represents the traditional application. The application OSS/BSS functionality is spread across multiple domains of the enterprise with service-specific implementation in many different systems, and with the application code instantiated in many places. At 90, different application teams package and present similar OSS/BSS functionality (i.e., assurance, ordering, provisioning, billing, inventory, and the like) in different ways. The complexity of the traditional application 90 is encapsulated into an AO package 92 in accordance with the disclosed embodiments. The application functionality is preferably packaged behind framework-standard SOA GUIs and APIs that encapsulate OSS/BSS implementations, and which are accessible from one application registry. An AO facilitates application composition and offer creation, and exposes standard functions which are easily found and accessed. In the AO 92, the framework required GUIs and APIs may terminate directly on domain OSS/BSS services and systems, or on application team provided encapsulations of OSS/BSS services and systems.

Figure 17:
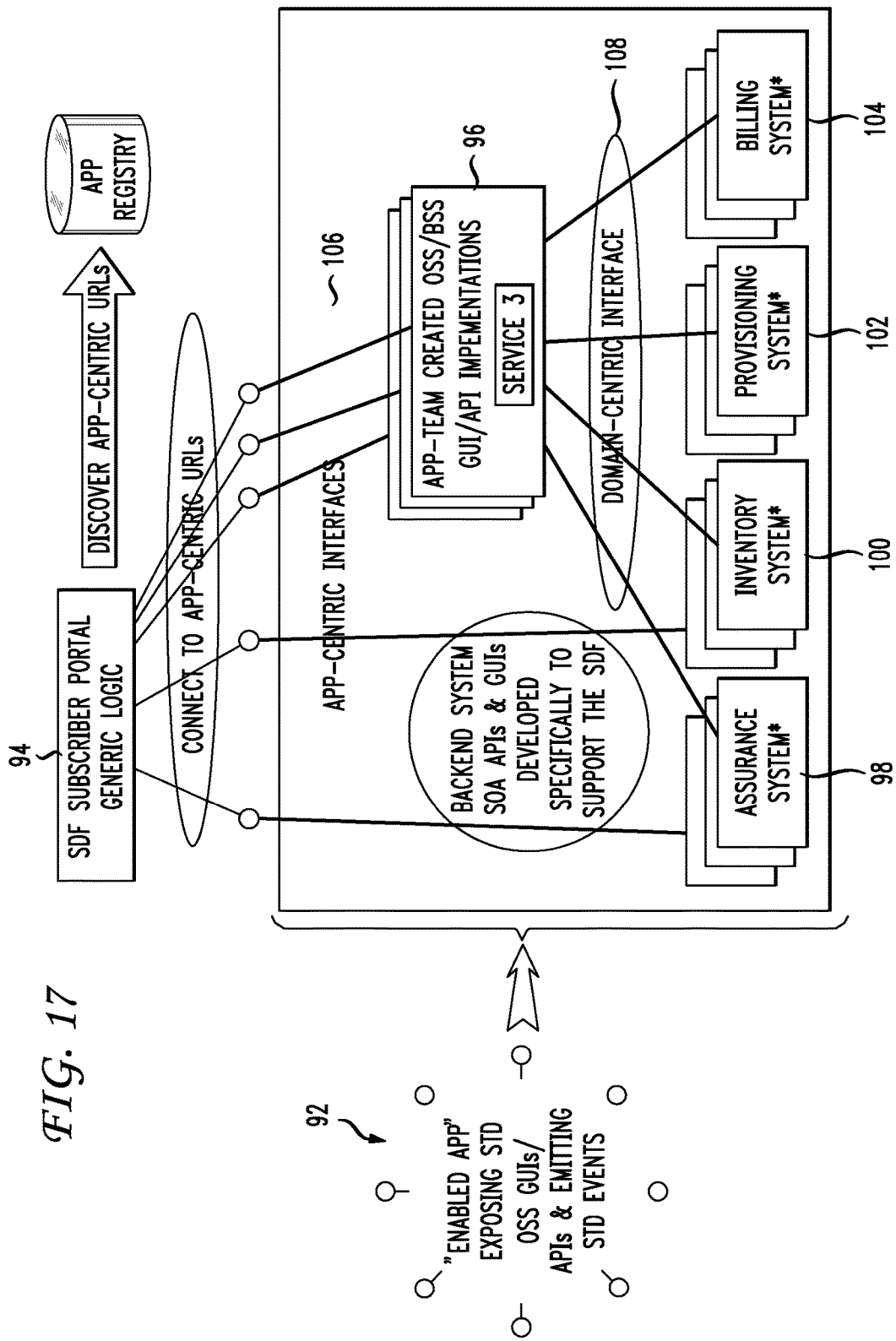

In FIG. 17, the AO 92 registers framework required pointers preferably URLs in the Application Registry to point to back-end system or application-team created implementations. The SDF subscriber portal 94 preferably connects to application-centric interfaces 106 through those URL pointers. These URL referenced interfaces include the OSS/BSS user interface presentation layer implementations created by the application-team, which connect to domain-centric interfaces 108, such as an assurance systems 98, inventory systems 100, provisioning systems 102, and billing systems 104.

Figure 18:
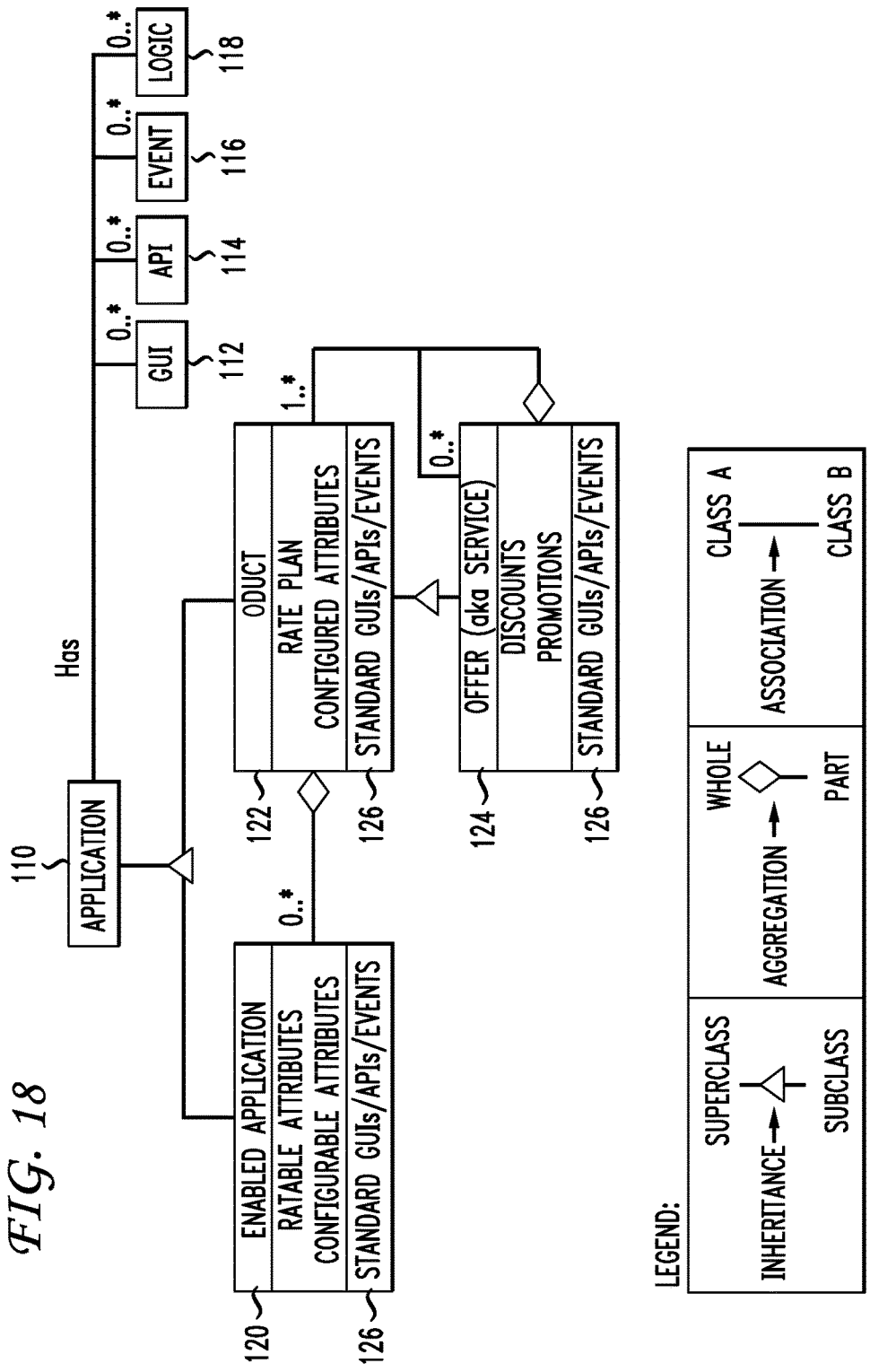
FIG. 18 is a block diagram defining a set of terms. An AO (depicted as an 'Enabled Application') is a type of Application. Products are derived from Enabled Applications and Offers and bundles of one or more Products and other Offers.

FIG. 18 shows the relationship between applications, AOs, products, and offers (also known as services). Applications 110 preferably include GUIs 112, APIs 114, events 116, and logic 118. AOs 120 are a subclass of applications 110, and expose framework-required GUIs, APIs, events, and functions which are orderable, billable, configurable, and manageable. Manageable functions are those that can be modified, cancelled, and added. Products 122 are preferably created from one AO 120 by configuring the AO's attributes and associating them with rate plans, terms and conditions, and the like. Offers, or services, 124 preferably bundle products with other offers and associated discounts and promotions with the bundle. Offers are presented to customers (also known as subscribers). The AO 120, product 122, and offer 124 all preferably make use of standard GUIs, APIs, and events 126.

Figure 19:
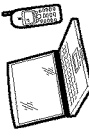
FIG. 19 shows a framework-aware subscriber portal interface.

FIG. 19 illustrates an example of a framework-aware subscriber portal. Region 128 represents a subscriber interface that includes a listing and description of service offers. This portal is a specialized application that enables subscribers to order, manage, and monitor registered offers. The portal consults information in the application registry to find and display eligible offers to subscribers, and to subsequently allow subscribers to manage them. Blocks 130 represent such services and offers. The portal has no offer-specific code or GUIs, but rather, references offer-specific information at URLs registered in the application registry. Subscriber portals are applications which may reside on hand held devices, set top TV boxes and enterprise web servers. Each can equally access the URLs registered for offers as stored in the application registry and render content in their portals that was generated by implementations at those the URLs. A device type passed in as context may cause the implementations to generate device specific output, or the management portal may translate generic output into a form more suited to the device on which the portal application is deployed.

Figure 20:
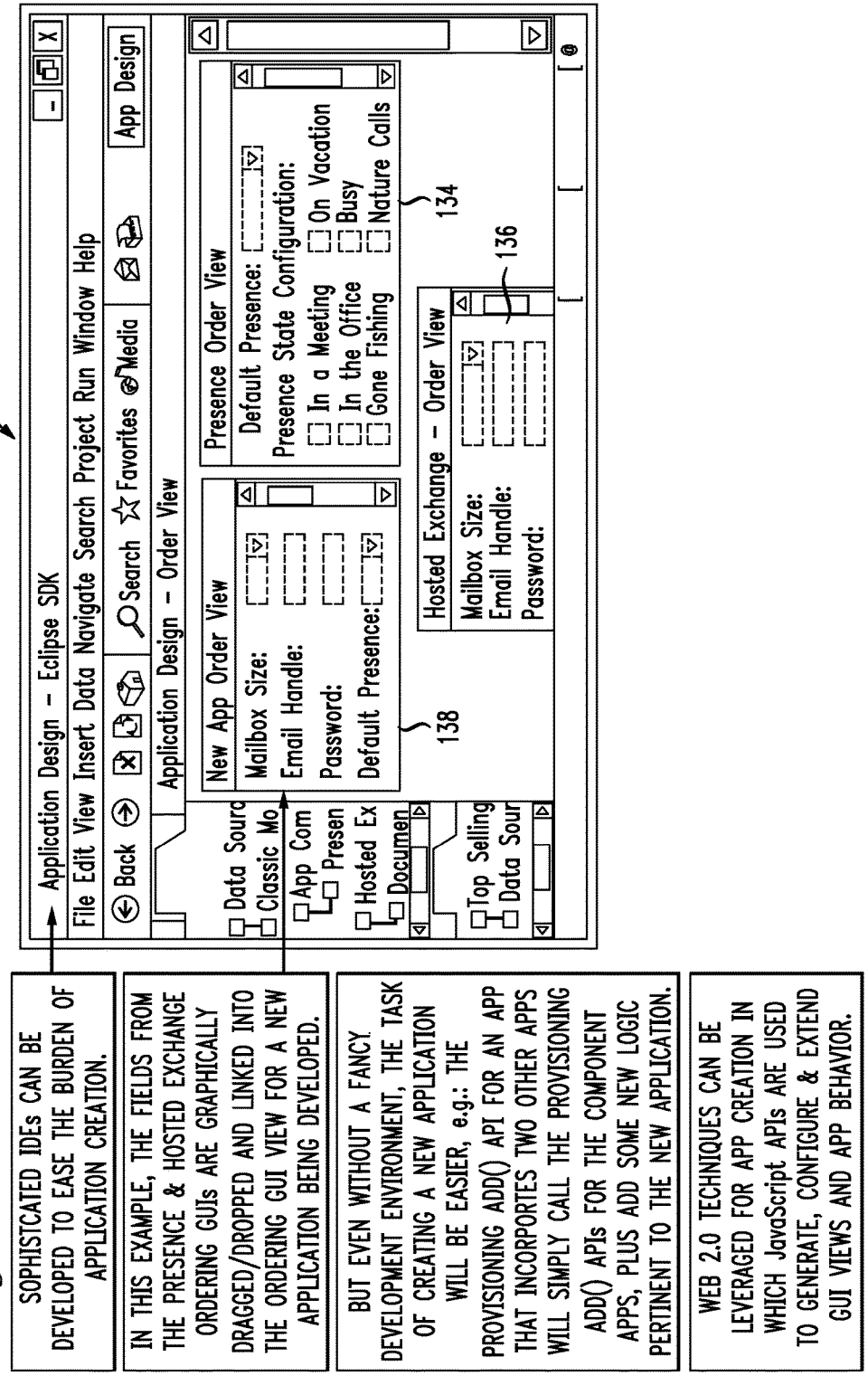
FIG. 20 depicts a graphical interactive development environment that helps developers create AOs using other AOs and reusable components.

FIG. 20 shows an example of an application creation environment. By reusing both runtime and standardized AO OSS/BSS interfaces, developers can create new applications more easily. Sophisticated IDEs 132, like those based on the Eclipse® IDE, can be developed to ease the burden of application creation. In this example, fields from the 'presence' 134 and 'hosted exchange' 138 ordering views are graphically dragged, dropped, and linked into the ordering view for a new AO 138 being developed. But even without a graphical development environment, the task of creating a new AO is easier by leveraging registered APIs of the component AOs.

Figure 21:
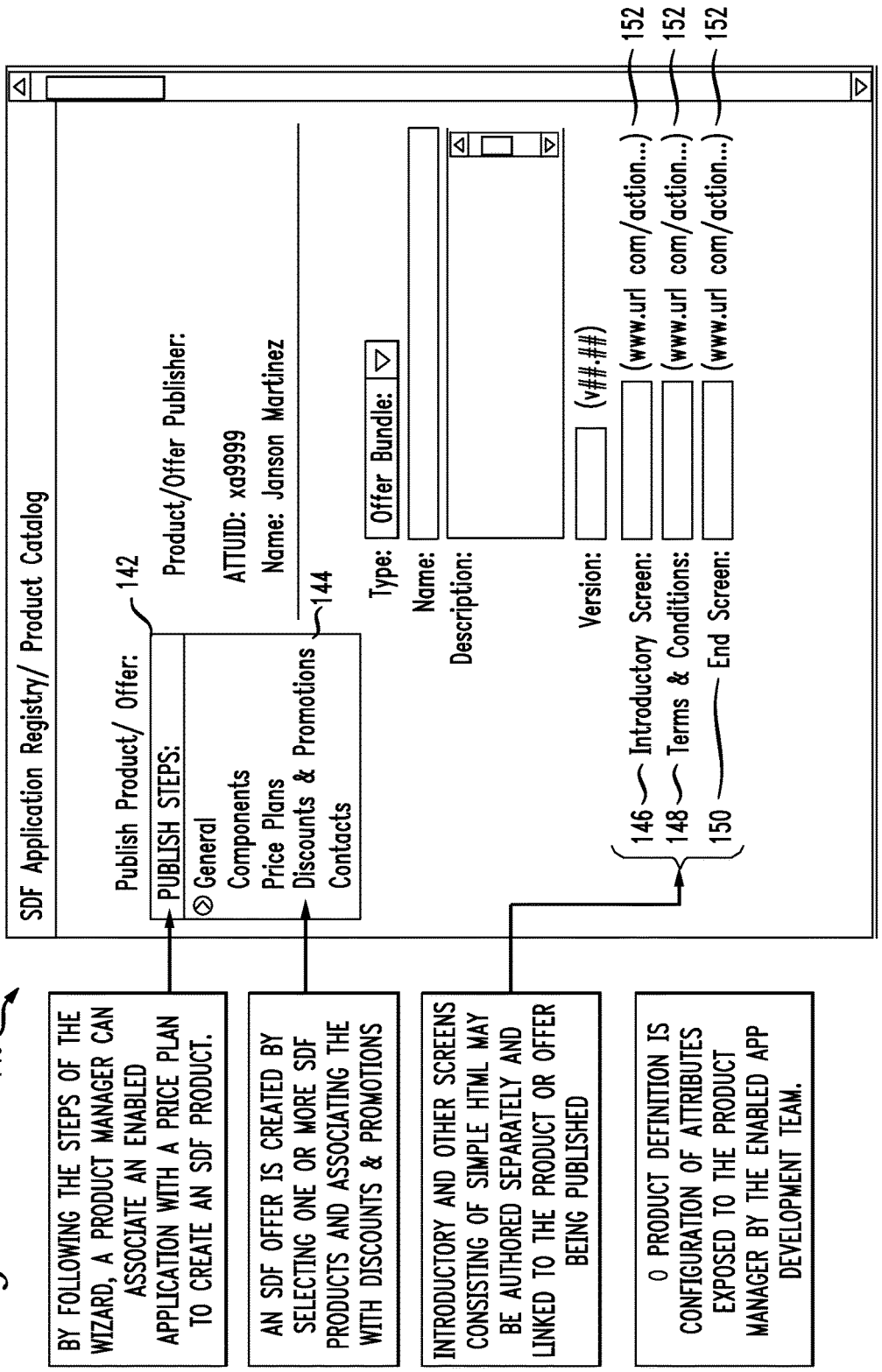
FIG. 21 depicts a product-offer wizard which helps product managers configure AOs into product and offer bundles.

FIG. 21 shows an embodiment of an offer management portal and product offer wizard. This portal and wizard is preferably a specialized application 140 that enables product managers to create products and offer bundles as specialized, non-developer mash-ups. By following the steps 142 of a wizard, a product manager can associate an enabled application with a price plan to create an SDF product. An SDF offer is further created by selecting one or more SDF products and associating them with discounts and promotions 144. Introductory screens 146, terms and conditions screens 148, end screens 150, and other marketing collateral screens may be authored separately and associated by links 152 to the product or offer being published. Configuration of attributes exposed to the product manager by the AO application development team is central to the creation of products.

Figure 22:
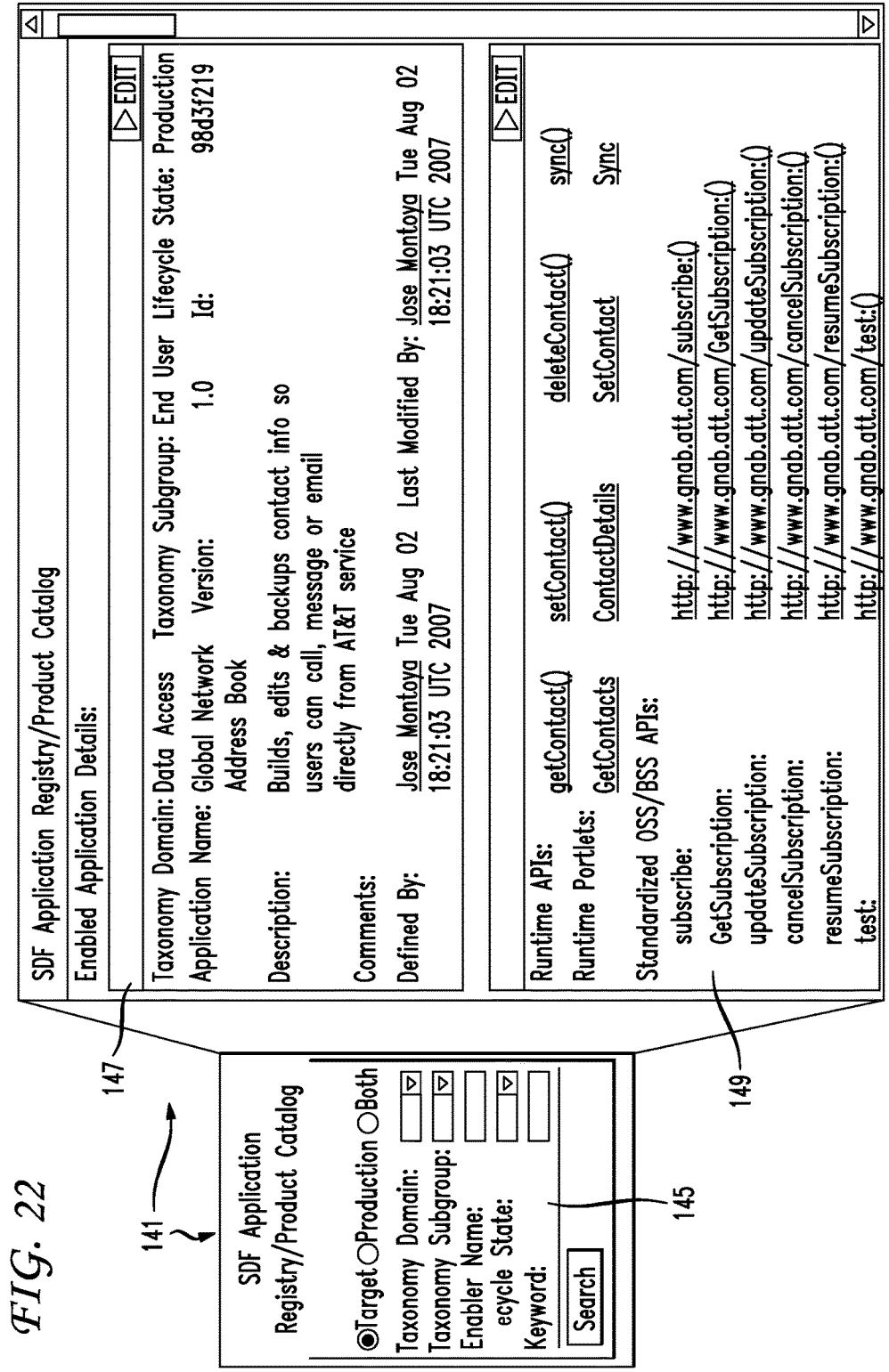
FIG. 22 shows an application registry interface through which AOs, products and offers may be searched, found, inserted, and updated.

FIG. 22 shows an example of an application registry. AOs register runtime and OSS interfaces so that developers and framework-aware tools can discover and access them. The SDF application registry/product catalog 141 preferably includes the AO search 145 function, which can readily locate an AO 147 and displays its information in the same registry 141. Search fields include, but are not limited to, taxonomy domain, taxonomy subgroup, AO name, lifecycle state, and keyword. An interface window 149 preferably shows the APIs and GUIs associated with a given AO. These include runtime APIs, such as getContact( ), setContact( ), deleteContact( ), sync( ), and the like; runtime views, such as GetContacts, ContactDetails, SetContact, Sync, and the like; and standardized OSS/BSS views, such as subscribe, trouble, fault, test, performance, availability, Service Level Agreement (SLA), inventory and which referenced preferably by URLs. An SLA is a formally negotiated agreement between two parties. It is a contract that exists between customers and their service provider, or between service providers. The SLA records a common understanding regarding services, priorities, responsibilities, guarantees, and the like, which is collectively known as the level of service. For example, it may specify the levels of availability, serviceability, performance, operation, or other attributes of the service like billing and even penalties in the case of violation of the SLA.

Figure 23:
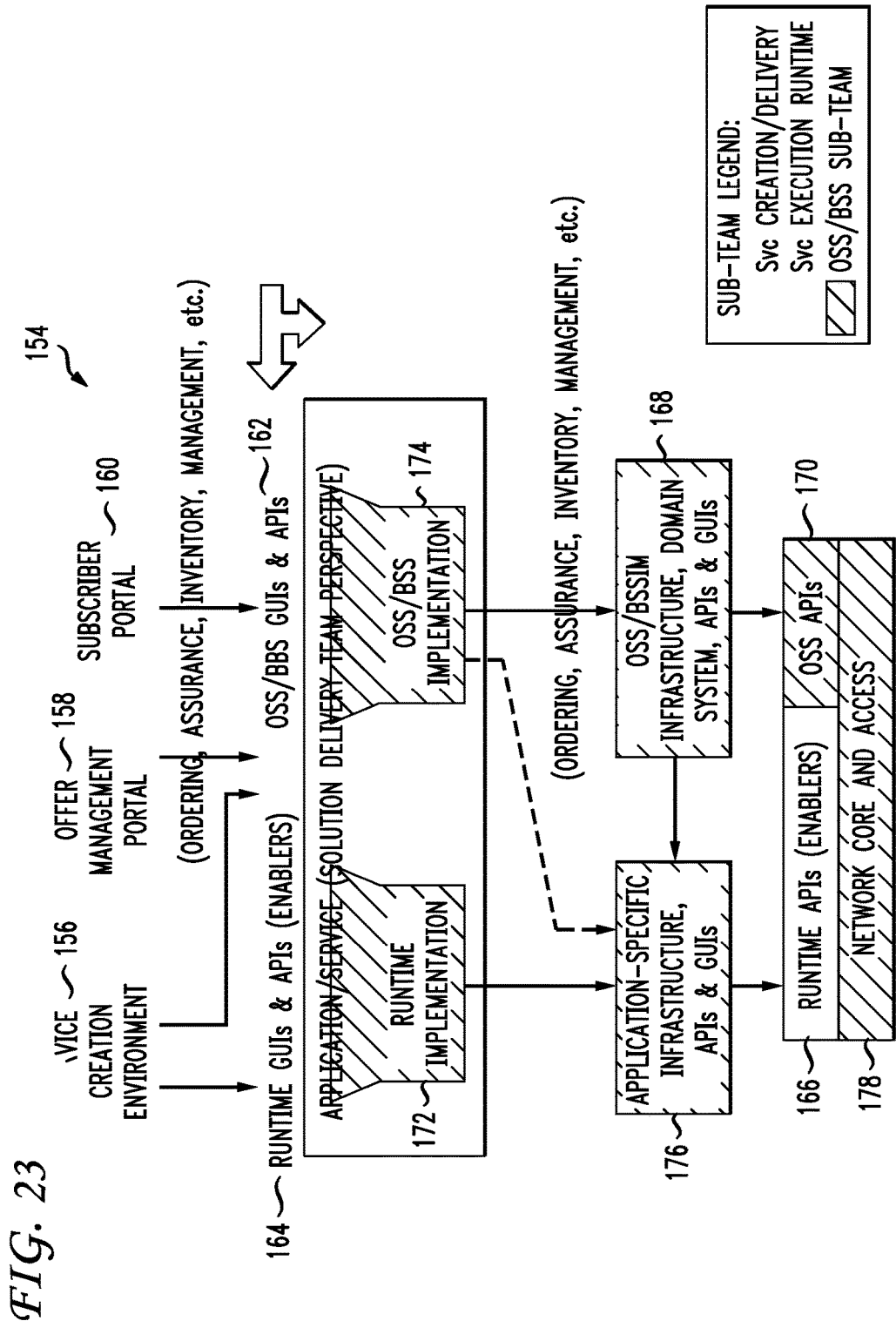
FIG. 23 is a block diagram showing the Common Architecture for Real Time Services (CARTS) sub-team relationships.

FIG. 23 shows a Common Architecture for Real Time Services (CARTS) sub-team relationships 154 viewed from the perspective of a service or application delivery team. The Service Creation and Delivery Framework (SCDF) team preferably specifies the service creation environment 156, offer management portal 158, subscriber portal 160, and the OSS/BSS GUIs and APIs 162. The Service Execution and Runtime Framework (SERF) team preferably specifies application runtime GUIs and APIs 164, and useful enablers, and specific runtime APIs 166. Finally, the OSS/BSS sub-team preferably specifies the OSS/BSS infrastructure, domain systems, APIs and GUIs 168, including the OSS/BSS APIs 170. Each application solution delivery team preferably develops both a runtime implementation 172, and an OSS/BSS implementation 174 and may deploy application-specific infrastructure 176, and access enablers encapsulating the network core and access layer of the architecture 178.

FIGS. 24-27 present different SDF scenarios describing the presentation of offers to a subscriber, offer subscription by a subscriber, management and monitoring of offers by a subscriber, and configuration of offers by a subscriber.

Figure 24:
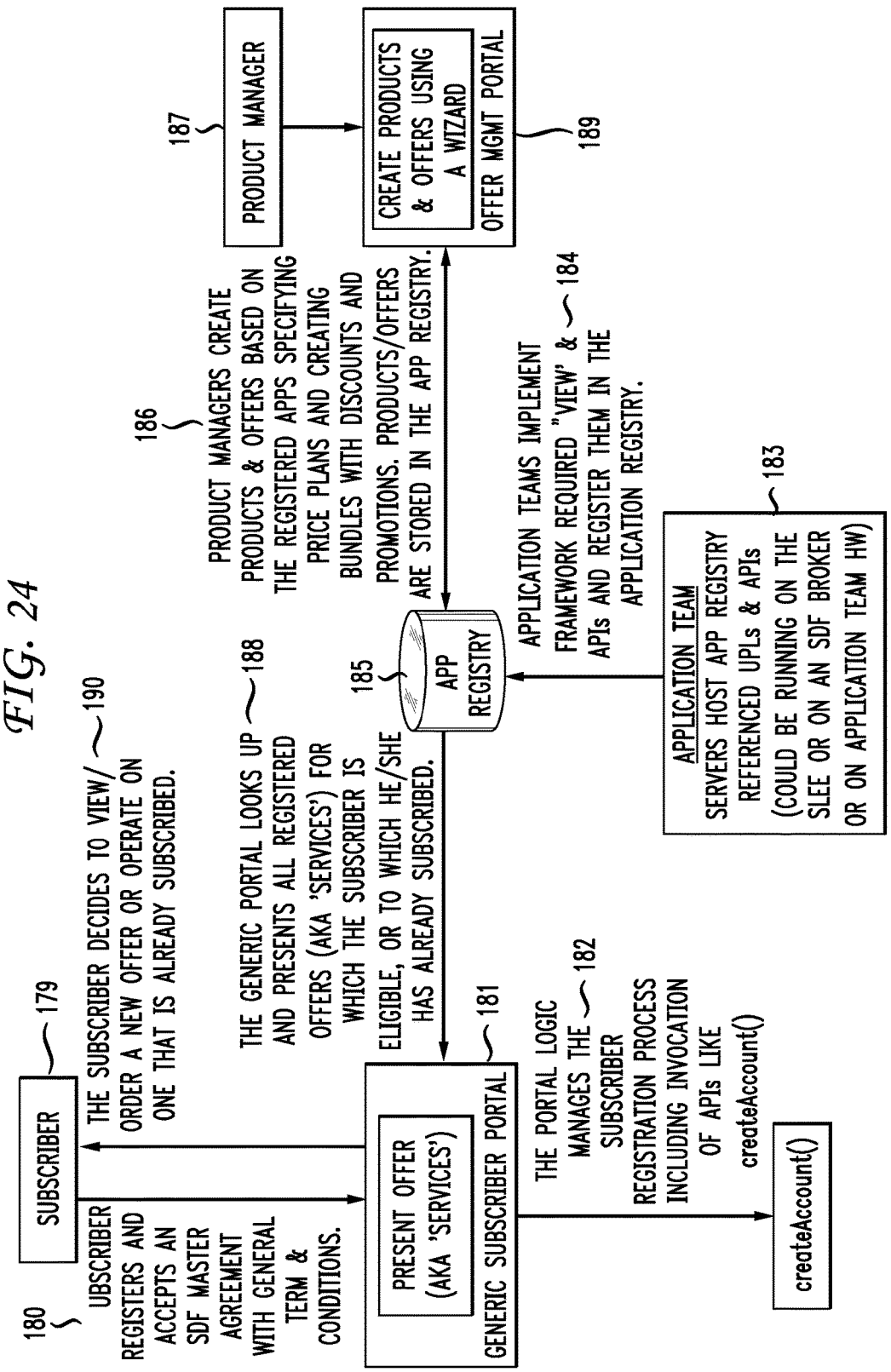
FIG. 24 is a block diagram showing the actors and components involved in the presentation of an offer to a subscriber through a management portal in the context of a Service Delivery Framework.

In FIG. 24, a framework aware portal presents registered offers to subscribers for ordering and management. First, at step 180, the subscriber 179 preferably registers and accepts an SDF master agreement with general terms and conditions. Next, at step 182, the portal logic manages the subscriber registration process including invocation of APIs, such as createAccount( ). Third, at step 184, AO application development teams implement framework required views and APIs, and register them in the application registry. Servers 183 host application registry 185 referenced URLs and APIs, which could be running on the SLEE, application team or other hardware. At step 186, in the offer management portal 189, product managers 187 preferably create products and offers using a product offer wizard that assists them in configuring the registered AOs, specifying price plans and creating bundles with discounts and promotions. Products and offers are then stored in the application registry 185. Next, at step 188, the generic portal 181 preferably presents registered offers (also known as services), for which the subscriber 179 is eligible, or to which the subscriber 179 has already subscribed. The generic subscriber portal can be built on existing portals. At step 190, the subscriber 179 decides to view and/or order a new offer or operate on one that is already subscribed.

Figure 25:
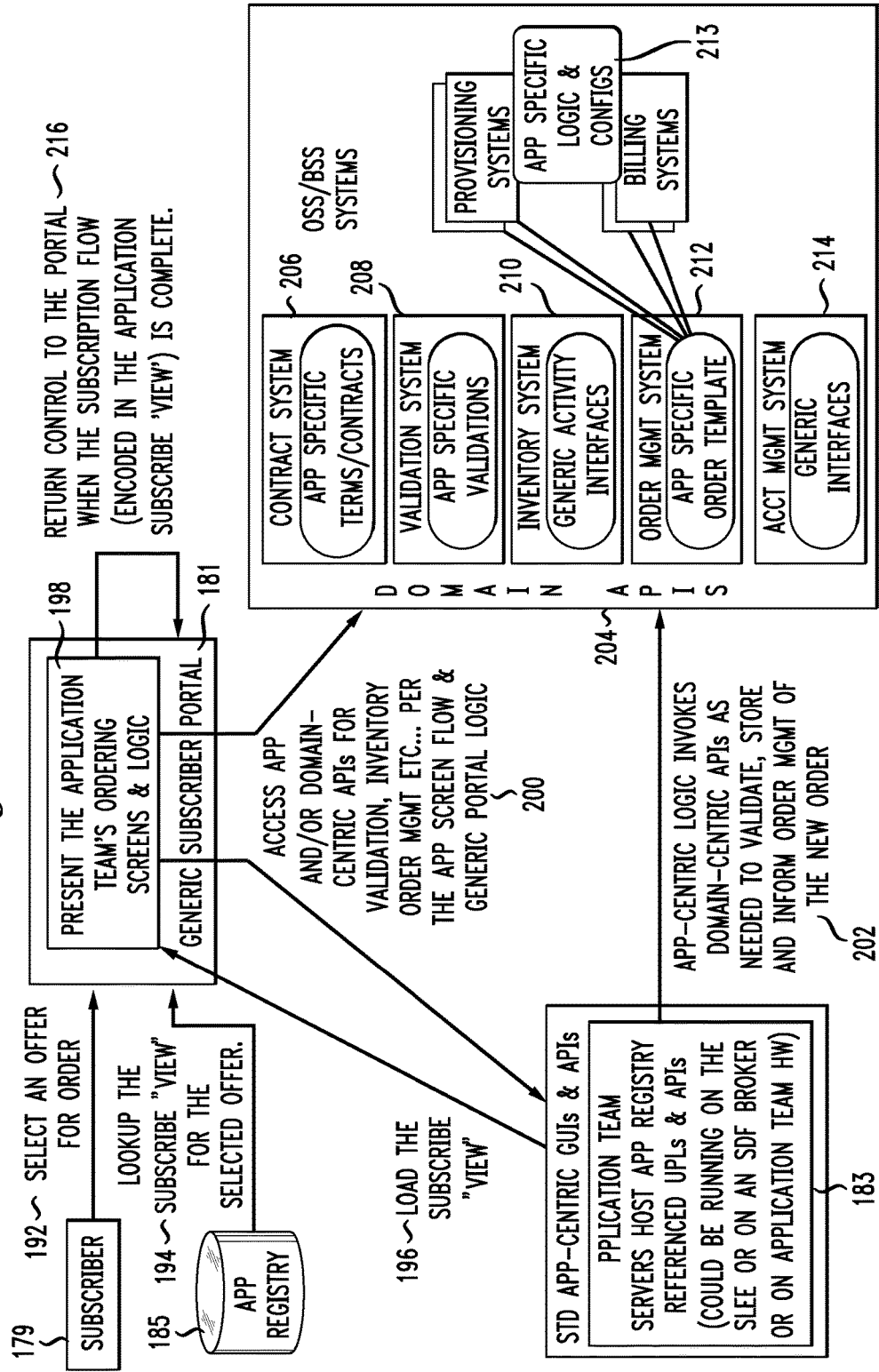
FIG. 25 is a block diagram showing the actors and components involved in the ordering of an offer by a subscriber through a management portal in the context of a Service Delivery Framework.

FIG. 25 illustrates the preferred steps to subscribing to an offer. The AO application-centric ordering view registered in the Application Registry encapsulates the complexity of domain-centric OSS/BSS provisioning and order management processes and APIs. First, at step 192, the subscriber 179 selects an offer for order. Next, at 194, the application registry 185 looks up the registered subscribe view for the selected offer. At step 196, the subscribe view is loaded. Next, at step 198, the application team's ordering screens and logic are presented. At step 200, this logic accesses application and/or domain-centric APIs for validation, inventory, order management, and the like, as the application view screen flow progresses. Next, at step 202, application-centric logic invokes domain-centric APIs as needed to validate, store, and inform order management of the new order. These domain APIs 204 are in the OSS/BSS systems, and include the contract system 206, with application specific terms and contracts; the validation system 208, with application specific validations; the inventory system 210, with generic order inventory interfaces; the order management system 212, with application specific order management templates, linked to the application specific logic and configurations 213 in the provisioning and billing systems; the account management system 214, with generic interfaces; and the like. Where OSS/BSS systems do not expose generic application-centric interfaces, application logic preferably calls application-centric APIs created by application teams, which call the domain-centric OSS/BSS systems. Next, at step 216, the application view screen flow completes and control necessarily returns to the generic subscriber portal 181.

Figure 26:
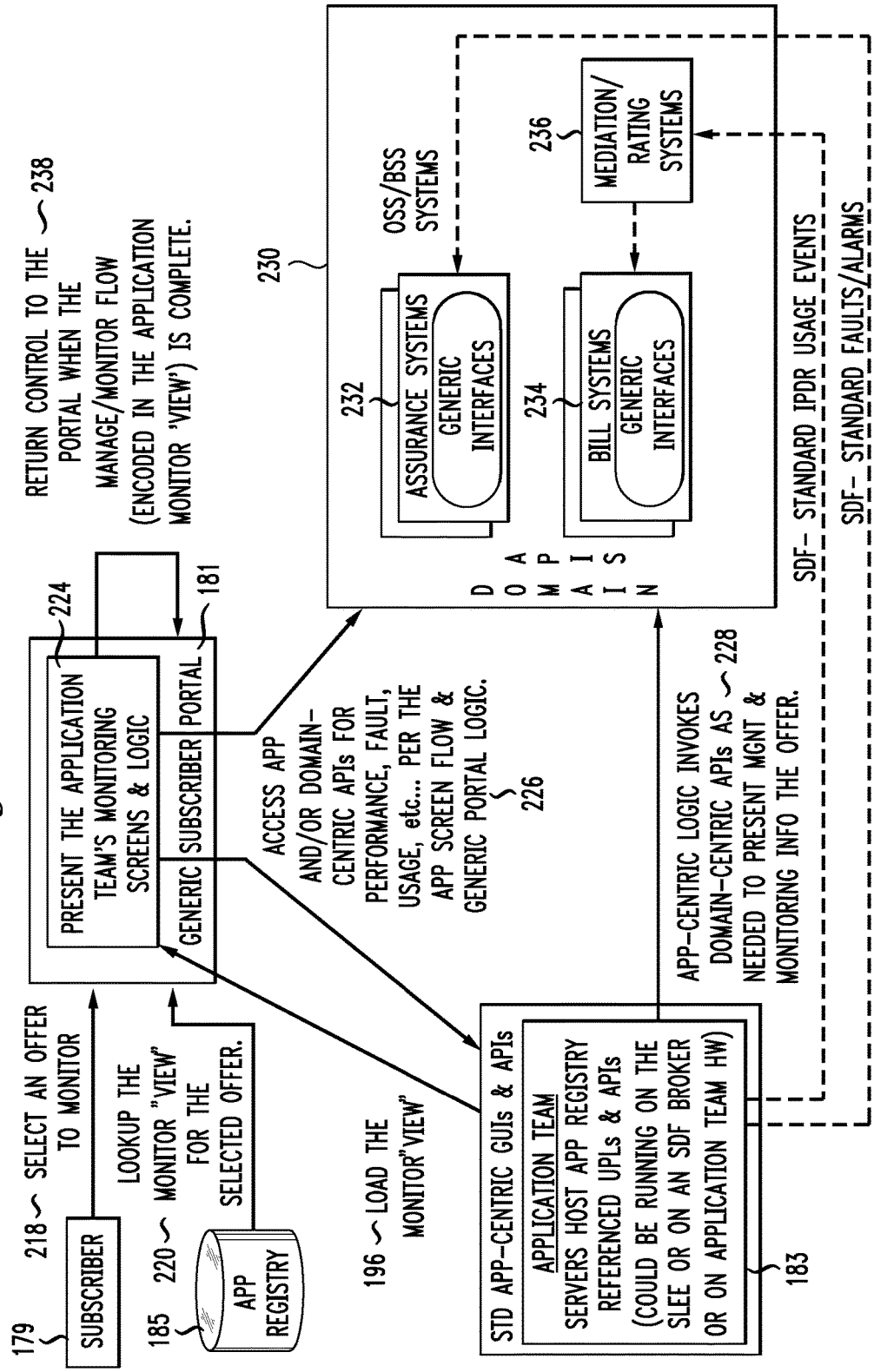
FIG. 26 is a block diagram showing the actors and components involved in the management and monitoring of an offer by a subscriber through a management portal in the context of a Service Delivery Framework.

FIG. 26 shows the preferred steps of managing and monitoring a subscribed offer, which is facilitated by application-centric monitoring views and SOA APIs. First, at step 218, the subscriber 179 selects an offer to monitor. Next, at 220, the application registry 185 looks up the monitor view for the selected offer. At step 222, the monitor view is loaded. Next, at step 224, the application monitoring screens and logic comprising the view are presented. At step 226, the view logic accesses application and/or domain-centric APIs for performance, fault, usage, and the like. Next, at step 228, application-centric logic invokes domain-centric APIs as needed to present management and monitoring information on the offer. These domain APIs 230 are in the OSS/BSS systems, and include the assurance systems 232 with generic interfaces; the billing system 234, with generic interfaces; the mediation/rating systems 236; and the like. At this point, the servers 183 may send information, such as SDF-standard IP Detail Record (IPDR) usage events, to the mediation/rating system 236. Further, the servers 183 may also send SDF-standard faults and/or alarms to the assurance systems 232. Next, at step 238, control is effectively returned to the generic subscriber portal 181 when the manage and monitor screen flow, which is encoded in the monitor view, is complete. The SDF may standardize the monitor view and associated APIs as several separate views such as performance, availability, trouble, usage, and the like.

Figure 27:
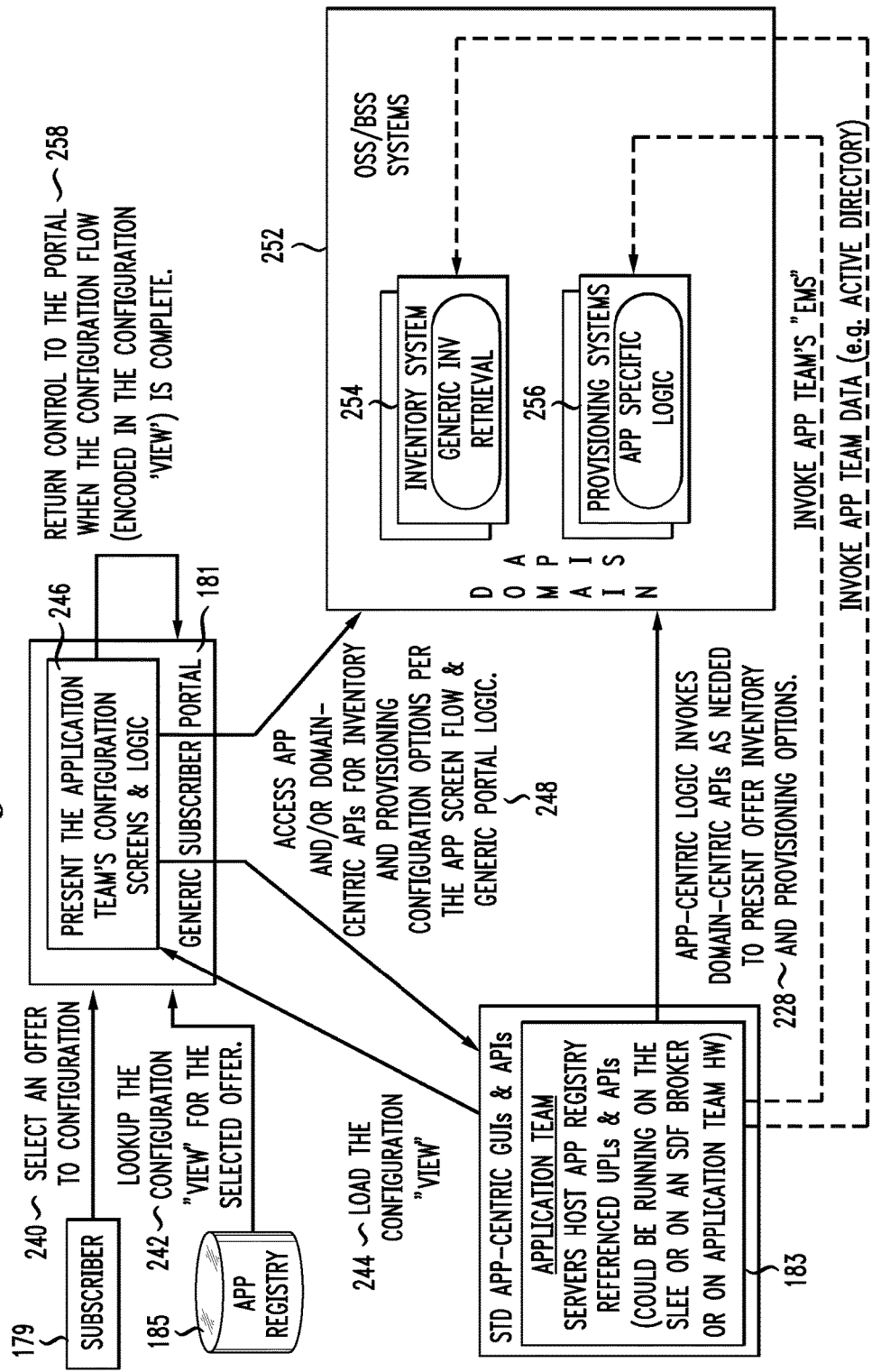
FIG. 27 is a block diagram showing the actors and components involved in the configuration of an offer by a subscriber through a management portal in the context of a Service Delivery Framework.

FIG. 27 shows the preferred steps for configuring an offer, which is facilitated by application-centric configuration views and associated SOA APIs. First, at step 240, the subscriber 179 selects an offer for configuration. Next, at 242, the application registry 185 looks up the configuration view for the selected offer. At step 244, the configuration view is loaded. Next, at step 246, the application configuration screens and logic are presented. At step 248, the view logic accesses application and/or domain-centric APIs for inventory and provisioning configuration options. Next, at step 250, application-centric logic invokes domain-centric APIs as needed to present offer inventory and provisioning options. These domain APIs 252 are in the OSS/BSS systems, and include the inventory systems 254 with generic inventory retrieval; the provisioning systems 256, with application specific logic; and the like. At this point, the servers 183 may invoke application Element Management System (EMS), which is typically provided by a vendor who makes a networking product as a system to manage the product, to the provisioning systems 256. Further, the inventory systems may communicate with the servers 183 by invoking the application team's data, such as the active directory. Next, at step 258, control is effectively returned to the generic subscriber portal 181 when the configuration flow, which is encoded in the configuration view, is complete. The configuration may also occur via runtime application user interfaces, but the subscriber portal preferably provides some subscriber facing configuration and inventory views.

Overall, the disclosed embodiments address the challenge of service delivery, which has been conventionally subject to restrictions imposed by standard software development lifecycle limitations and typically involves re-creation of existing functionality. The disclosed embodiments seek to dramatically shorten the release cycle for products and offers by providing a powerful Application Object (AO) reuse abstraction, whereas, in the past, reuse initiatives have focused on reuse of general code/object modules, GUI widgets or programmatic interfaces, such as SOA.

The challenge of reuse is related to the ability of users to search and find functionality to reuse, and the support model for assets being reused. If, by placing general assets in the reuse repository, organizations open themselves up to support issues, without funding, they will be disinclined to contribute assets. If assets found by searching the repository come with no support, then reuse will also be discouraged. SOA solves this problem for the functionality behind interfaces by providing a well described interface contract that is supported by the organization responsible for the SOA API. The disclosed embodiments provide greater value by making entire applications reusable objects including multiple OSS and runtime API sets, as well as interactive GUIs. The AOs preferably conform to requirements in order for them to be able to be manipulated consistently by management portals and Interactive Development Environments (IDEs).

The disclosed embodiments are beneficial since it enables product managers to dynamically create new service offers by combining, customizing and reusing a library of AOs. Further, the manual work that would otherwise be required to create these offers is eliminated. The disclosed embodiments also preferably eliminate manual programming in the subscriber portal to present, manage, and monitor new service offers. Once created and registered in the SDF product catalog/application registry, new offers are preferably instantly viewable and able to be manipulated through the portal. Product managers can thus focus on creating offers that provide the features and billing options that best satisfy the needs of selected customer segments. Product managers can also create new offers, bundles, promotions and billing plans with little or no developer involvement. The disclosed embodiments also make it possible to quickly create trials that test the market, helping refine new service concepts and feature combinations.

The disclosed embodiments, for example, are beneficial to telecommunications companies deploying an Internet Protocol Multimedia Subsystem (IMS) SDF/Session Description Protocol (SDP) environment, as well as any company that makes IMS SDF/SDP solutions, and/or supplies or develops applications that must conform to a rigorous application framework (i.e., cable companies, Internet companies, and the like).

Although preferred embodiments of the disclosed embodiments have been described herein with reference to the accompanying drawings, it is to be understood that the disclosed embodiments are not limited to those precise embodiments and that various other changes and modifications may be affected herein by one skilled in the art without departing from the scope or spirit of the disclosed embodiments, and that it is intended to claim all such changes and modifications that fall within the scope of the disclosed embodiments.

What is claimed is:

1. A method of creating a service offer associated with a service framework, the method comprising:
    generating, using a development environment, a plurality of reusable application objects, the plurality of reusable application objects representing a prototype service offer, the prototype service offer being associated with the service offer, each of the plurality of reusable application objects comprising a function to be invoked during runtime, each of the plurality of reusable application objects comprising a configurable attribute, the configurable attribute defining the service offer, each of the plurality of reusable application objects further comprising an application program interface, the application program interface providing functionality of the service offer during runtime;
    storing the plurality of reusable application objects and prototype service offers configured from the plurality of reusable application objects in an application registry;
    supporting ordering, management, and monitoring of the prototype service offer through one or more management portals without requiring service offer specific portal integration by referencing prototype service offer information in the application registry;
    adapting the plurality of reusable application objects to comprise standardized Operational Support System/Business Support System (OSS/BSS) views referenced by Uniform Resource Locators (URLs), wherein the OSS/BSS views input a standardized context object and output a presentation layer in accordance with a Service Delivery Framework (SDF);
    referencing the plurality of reusable application objects using view pointer references, wherein the view pointer references provide a layer of indirection and loose coupling to enable the plurality of reusable application objects to encapsulate operational support system/business support system (OSS/BSS) infrastructures to be used by the one or more management portals;
    generating a services marketplace supported by OSS/BSS providers that enables creation and reuse of the plurality of reusable application objects by different application creators; and
    enabling, using a runtime environment, use of the plurality of reusable application objects during runtime.

2. The method of creating a service offer defined by claim 1, further comprising generating, using the plurality of reusable application objects, an event associated with the service framework that enables a feature selected from a group consisting of consistent billing associated with service, billing on behalf of a third-party service provider, and revenue splitting.

3. The method of creating a service offer defined by claim 1, further comprising storing, using the plurality of reusable application objects, a uniform resource locator pointer that implements the function and provides coupling between an implementation behind the plurality of reusable application objects and a portal accessing the plurality of reusable application objects.

4. The method of creating a service offer defined by claim 1, further comprising providing, using the plurality of reusable application objects, a messaging service.

5. The method of creating a service offer defined by claim 4, wherein the messaging service enables signaling using an on-line message.

6. The method of creating a service offer defined by claim 4, wherein the messaging service enables signaling using an email.

7. The method of creating a service offer defined by claim 4, wherein the messaging service enables conversion between speech and text.

8. The method of creating a service offer defined by claim 1, further comprising providing, using the plurality of reusable application objects, a notification service.

9. The method of creating a service offer defined by claim 8, further comprising:
enabling, using the notification service, a user to define an alert condition; and transmitting, using the notification service, a message in response to satisfying the alert condition.

10. The method of creating a service offer defined by claim 9, wherein the message is transmitted using a voice portal.

11. The method of creating a service offer defined by claim 8, further comprising enabling, using the notification service, control of a subscriber mobile web initiative signal.

12. The method of creating a service offer defined by claim 1, further comprising:
providing, using the plurality of reusable application objects, a presence service; and
enabling, using the presence service, a first user to view presence information associated with a second user.

13. The method of creating a service offer defined by claim 1, further comprising enabling, using the runtime environment, modification of the plurality of reusable application objects during runtime.

14. A computer-readable medium comprising instructions that, when executed by an apparatus, create a service offer associated with a service framework by performing operations comprising:
generating, using a development environment, a plurality of reusable application objects, the plurality of reusable application objects representing a prototype service offer, the prototype service offer being associated with the service offer, each of the plurality of reusable application objects comprising a function to be invoked during runtime, each of the plurality reusable of application objects comprising a configurable attribute, the configurable attribute defining the service offer, each of the plurality of reusable application objects further comprising an application program interface, the application program interface providing functionality of the service offer during runtime;
storing the plurality of reusable application objects and prototype service offers configured from the plurality of reusable application objects in an application registry;
supporting ordering, management, and monitoring of the prototype service offer through one or more management portals without requiring service offer specific portal integration by referencing prototype service offer information in the application registry;
adapting the plurality of reusable application objects to comprise standardized Operational Support System/Business Support System (OSS/BSS) views referenced by Uniform Resource Locators (URLs), wherein the OSS/BSS views input a standardized context object and output a presentation layer in accordance with a Service Delivery Framework (SDF);
referencing the plurality of reusable application objects using view pointer references, wherein the view pointer references provide a layer of indirection and loose coupling to enable the plurality of reusable application objects to encapsulate operational support system/business support system (OSS/BSS) infrastructures to be used by the one or more management portals;
generating a services marketplace supported by OSS/BSS providers that enables creation and reuse of the plurality of reusable application objects by different application creators; and
enabling, using a runtime environment, use of the plurality of reusable application objects during runtime.

15. The computer-readable medium defined by claim 14, wherein the operations further comprise generating, using the plurality of reusable application objects, an event associated with the service framework that enables a feature selected from a group consisting of consistent billing associated with service, billing on behalf of a third-party service provider, and revenue splitting.

16. The computer-readable medium defined by claim 14, wherein the operations further comprise storing, using the plurality of reusable application objects, a uniform resource locator pointer that implements the function and provides coupling between an implementation behind the plurality of reusable application objects and a portal accessing the plurality of reusable application objects.

17. The computer-readable medium defined by claim 14, wherein the operations further comprise providing, using the plurality of reusable application objects, a messaging service.

18. A system to create a service offer associated with a service framework, the system comprising:
a processing device; and
a computer readable medium comprising instructions that, when executed by the processing device, create the service offer associated with the service framework by performing operations comprising:
generating, using a development environment, a plurality of reusable application objects, the plurality of reusable application objects representing a prototype service offer, the prototype service offer being associated with the service offer, each of the plurality of reusable application objects comprising a function to be invoked during runtime, each of the plurality of reusable application objects comprising a configurable attribute, the configurable attribute defining the service offer, each of the plurality of reusable application objects further comprising an application program interface, the application program interface providing functionality of the service offer during runtime;
storing the plurality of reusable application objects and prototype service offers configured from the plurality of reusable application objects in an application registry;
supporting ordering, management, and monitoring of the prototype service offer through one or more management portals without requiring service offer specific portal integration by referencing prototype service offer information in the application registry;
adapting the plurality of reusable application objects to comprise standardized Operational Support System/Business Support System (OSS/BSS) views referenced by Uniform Resource Locators (URLs), wherein the OSS/BSS views input a standardized context object and output a presentation layer in accordance with a Service Delivery Framework (SDF);
referencing the plurality of reusable application objects using view pointer references, wherein the view pointer references provide a layer of indirection and loose coupling to enable the plurality of reusable application objects to encapsulate operational support system/business support system (OSS/BSS) infrastructures to be used by the one or more management portals;

generating a services marketplace supported by OSS/BSS providers that enables creation and reuse of the plurality of reusable application objects by different application creators; and enabling, using a runtime environment, use of the plurality of reusable application objects during runtime.

19. A plurality of reusable application objects to create a service offer associated with a service framework, the plurality of reusable application objects comprising:

a representation of a prototype service offer, the prototype service offer being associated with the service offer;

a function to be invoked during runtime;

standardized Operational Support System/Business Support System (OSS/BSS) views referenced by Uniform Resource Locators (URLs), wherein the OSS/BSS views input a standardized context object and output a presentation layer in accordance with a Service Delivery Framework (SDF);

a configurable attribute, the configurable attribute defining the service offer; and an application program interface, the application program interface providing functionality of the service offer during runtime, the plurality of reusable application objects being usable during runtime, wherein the plurality of reusable application objects are created and reused by different application creators in a services marketplace supported by OSS/BSS providers.

20. The plurality of reusable application objects defined by claim 19, wherein the plurality of reusable application objects is modifiable during runtime.

* * * * *

UNITED STATES PATENT AND TRADEMARK OFFICE
CERTIFICATE OF CORRECTION

| | | |
|---|---|---|
| PATENT NO. | : 10,296,300 B2 | Page 1 of 1 |
| APPLICATION NO. | : 14/659873 | |
| DATED | : May 21, 2019 | |
| INVENTOR(S) | : Erickson et al. | |

It is certified that error appears in the above-identified patent and that said Letters Patent is hereby corrected as shown below:

On the Title Page

Item (73), The Assignee AT&T SERVICES, INC. should be corrected to read --AT&T INTELLECTUAL PROPERTY I, LP--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*